United States Patent
Masuzawa et al.

(10) Patent No.: US 6,462,907 B1
(45) Date of Patent: *Oct. 8, 2002

(54) DISKETTE INCORPORATING A PERMANENT MAGNET GENERATOR HAVING A STATOR WITH MAGNETIC POLE TEETH THAT ARE AXIALLY THINNER THAN A PERMANENT MAGNET THAT COOPERATES WITH THE STATOR

(75) Inventors: Masahiro Masuzawa, Fukaya; Fumio Kimura, Gyoda; Toshiko Takahashi; Masahiro Mita, both of Fukaya, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,420

(22) Filed: Aug. 6, 1999

(30) Foreign Application Priority Data

Aug. 7, 1998 (JP) .......................................... 10-224051
Nov. 20, 1998 (JP) .......................................... 10-330089

(51) Int. Cl.[7] ............................................. G11B 23/03
(52) U.S. Cl. ....................................... 360/133; 360/137
(58) Field of Search ................................. 360/133, 137

(56) References Cited

U.S. PATENT DOCUMENTS

| | | | |
|---|---|---|---|
| 5,159,182 A | 10/1992 | Eisele | |
| 5,584,043 A | 12/1996 | Burt | |
| 6,265,800 B1 | * 7/2001 | Kimura et al. | 360/137 |

FOREIGN PATENT DOCUMENTS

| | | | |
|---|---|---|---|
| DE | 41 22 170 | * | 1/1993 |
| DE | 195 48 831 A1 | | 5/1996 |
| EP | 0 570 231 A1 | | 11/1993 |
| EP | 0 652 622 A2 | | 5/1995 |
| JP | 7-500238 | | 1/1995 |
| JP | 7-86912 | | 9/1995 |

OTHER PUBLICATIONS

Furlani E P: "Field Analysis and Optimization of NdFCB Axial Field Permanent Magnet Motors"; IEEE Transactions On Magnetics, US, IEEE Inc., New York, vol. 33, No. 5, pp. 3883–3885 XPOOO703246 Sep. 1997.
English translation of Japanese Tokuhyo 7–500238, Aug. 20, 1999.

* cited by examiner

*Primary Examiner*—Craig A. Renner
(74) *Attorney, Agent, or Firm*—Sughrue Mion, PLLC

(57) ABSTRACT

A diskette incorporating a flat disk-shaped permanent magnet generator is disclosed. This permanent magnet generator comprises a rotor having a permanent magnet that can rotate together with a hub; the permanent magnet having a plurality of rotor magnetic poles on the circumference thereof, and a stator comprising a plurality of magnetic pole teeth having on one end thereof stator magnetic poles that can face the rotor magnetic poles via a magnetic gap. The magnetic pole teeth extend from the stator magnetic poles outside of the rotor, with stator coils wound on the extended portions of the magnetic pole teeth and the outside ends of the magnetic pole teeth connected to each other by a back yoke. The thickness of the outward extending magnetic pole teeth is smaller than the thickness of the permanent magnet. The diskette should preferably be a 3.5" floppy disk.

64 Claims, 26 Drawing Sheets

FIG. 10A
FIG. 10B
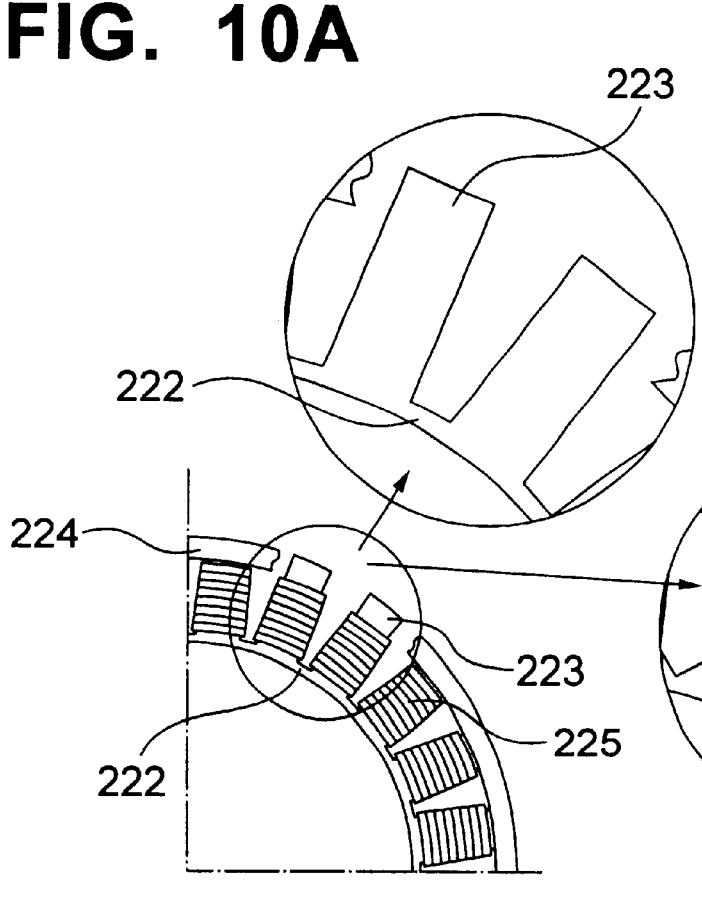
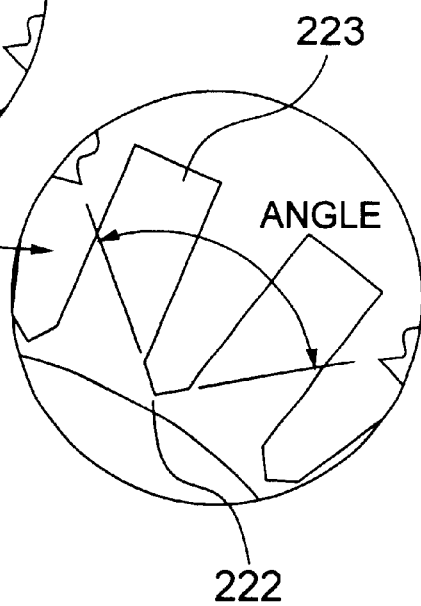

DISKETTE INCORPORATING A PERMANENT MAGNET GENERATOR HAVING A STATOR WITH MAGNETIC POLE TEETH THAT ARE AXIALLY THINNER THAN A PERMANENT MAGNET THAT COOPERATES WITH THE STATOR

FIELD OF THE INVENTION

The present invention relates generally to a diskette incorporating a permanent magnet generator, and more particularly to a diskette incorporating a permanent magnet generator, and a permanent magnet generator that is incorporated in a diskette used by inserting into a floppy disk drive, and when a memory is installed in the diskette, serves as a power source for the memory to input and output data in the memory.

DESCRIPTION OF THE RELATED ART

Medical information, such as personal medical checkup results, is stored in an IC card, from which medical institutions can retrieve such information for use in the treatment of the patient, and can store the contents of his case records in the card. Plans are also now under way to use IC cards as electronic cash. Under the plans, data on a customer's bank account, password, and his bank balance, if necessary, are stored in an IC card, by means of which payment is made on-line every time the customer buys a product.

It has been proposed that an enormous amount of video information handled by a digital camera should be stored in a flash memory that has a capacity as large as a couple of megabytes to 10 megabytes. A flash memory in which the video information is taken by a digital camera can be connected to a personal computer for subsequent video processing. The use of a flash memory to record the video information taken by a digital camera may eliminate an additional external memory unit, such as MOs.

The widespread use of IC cards or flash memories, as discussed above, has been deterred by the need for special input/output (I/O) devices dedicated for such media. Since most commonly used I/O devices for personal computers are floppy disk drives, particularly 3.5" floppy disk drives, the use of 3.5" floppy disks as an I/O device for IC cards and flash memories could spur their proliferation. In fact, adapters that can be inserted or incorporated in 3.5" floppy disk drives have already been proposed. A conventional type of 3.5" floppy disk drive has magnetic head to read and write information from and into a 3.5" diskette and a drive shaft to cause the diskette to rotate at 300 rpm, but it has no power feeding terminals. In diskette-shaped adapters, as discussed above, a button battery is incorporated as a power source for the built-in CPU. A battery, which depletes as it is used, has to be replaced with a new one every four to five months at the longest.

Introduction of a 3.5" floppy disk in which a generator is incorporated and driven by the rotation of the drive shaft of the 3.5" floppy disk drive would prove very useful, giving momentum to the proliferation of IC cards and similar media. In fact, the concept of incorporating a generator in a 3.5" diskette has already been proposed in Published Examined Japanese Patent Application No. Hei-7(1995)-86912 and Tokuhyo Hei-7(1995)-500238, the published Japanese translation of PCT international publication for patent application.

Published Examined Japanese Patent Application No. Hei-7(1995)-86912 discloses that a generator is incorporated in a 3.5" diskette, and that the generator has a rotor, a stator and a regulator, but its detailed construction is not disclosed. Tokuhyo Hei-7(1995)-500238 discloses a generator incorporated in a 3.5" diskette having a permanent magnet that rotates with a hub, which is caused to rotate by the drive shaft of a floppy disk drive. This permanent magnet is of a cylindrical shape, magnetized in the axial direction so that multiple magnetic poles are provided on the end face of the cylinder. The magnetic poles of a stator yoke are disposed in such a manner as to sandwich the cylindrical permanent magnet, and a stator coil is provided between the stator yokes on both sides of the cylindrical permanent magnet. Another example is also disclosed in which magnetic poles are provided on the circumferential surface of the cylindrical permanent magnet. In this example, the magnetic poles of the stator yoke are of a claw pole shape.

In this way, these documents state a permanent magnet type generator incorporated in a 3.5" diskette, but it is unknown how much output can be produced with such a generator because they do not disclose the material of permanent magnet suitable for use in such a generator, and the detailed construction of the rotor and stator.

Now, let us consider a permanent magnet generator of a size that can be incorporate in a 3.5" floppy disk, as disclosed in Tokuhyo Hei-7(1995)500238, where the cylindrical permanent magnet is magnetized in such a manner that multiple magnetic poles are provided on the end face of the cylinder. In this case, stator magnetic poles are disposed on both sides of the cylinder end face via small magnetic gaps. Since the allowable thickness of a generator in a diskette is 2.0 to 2.5 mm, the thickness of the permanent magnet is only 0.5 to 0.8 mm at most. Even when a material having a large coercive force is used for a magnet with such a short distance between-magnetic poles, only a small magnetomotive force can be expected. Even if magnetomotive force is increased by increasing the thickness of the magnet, the allowable thickness of the stator magnetic poles is reduced, making it difficult to pass sufficient magnetic flux in them.

In a permanent magnet generator where magnetic poles are provided on the circumferential surface of the cylindrical permanent magnet and the claw pole type stator yoke is provided, as disclosed in Tokuhyo Hei-7(1995)-500238, the end yoke of both claw pole type magnetic poles is provided facing each other within the allowable thickness of 2.0 to 2.5 mm for the generator, and a stator winding is provided between the end yoke. Since a sufficient number of winding turns cannot be provided within the allowable length of no more than 1 mm for the stator winding. Thus, a generator having a low output voltage would result.

In order to realize a generator having as high an output as possible and as low distortion as possible, it is necessary to dispose rotor magnetic poles on the circumferential surface of the cylindrical permanent magnet at equal angular intervals, make the number of magnetic poles of the stator yokes equal to the number of magnetic poles of the rotor permanent magnet, and dispose the stator magnetic poles facing the permanent magnet magnetic poles via magnetic gaps of substantially the same size. If a generator of such a construction is to be incorporated in a thin 3.5" diskette, the teeth of the stator magnetic poles must be extended outward in the radial direction from the stator magnetic poles. When the number of magnetic poles is 12 to 24 and the inside diameter of the stator yoke is 30 mm, the inner circumferential dimensions of the stator yoke given to one magnetic pole is as small as 8 to 4 mm. If stator magnetic poles of a 4-mm width are used, the gaps between the stator magnetic poles is not more than 4 mm. The gaps between the magnetic pole teeth, however, become considerably larger along the outer circumference of the stator magnetic poles, beyond which the teeth of the stator magnetic poles extend outward in the radial direction.

Since the allowable thickness of a generator is 2.0 to 2.5 mm, as described above, the allowable thickness of the stator coil is 0.6 to 0.8 mm on one side if the thickness of the stator magnetic poles is 0.8 mm. No matter how densely a coil is wound on this thin allowable coil thickness, the number of turns of coil cannot be increased too much. On the outer circumference of the stator magnetic pole where the gaps between the magnetic pole teeth are large, the gaps between the coils will have to be increased, producing a large dead space around them. This is contrary to the purpose of the present invention to reduce space as much as possible when a permanent magnet generator is incorporated in a small diskette.

SUMMARY OF THE INVENTION

It is therefore an object of the present invention to provide a diskette incorporating a thin permanent magnet generator that can eliminate dead space within the generator and produce a sufficient output.

It is another object of the present invention to provide a diskette incorporating a permanent magnet generator having such a construction that even when the relative position of the diskette to the floppy disk drive is shifted, the entire generator can self-adjust its position with respect to the diskette incorporating the generator by aligning with the drive shaft of the floppy disk drive.

It is a further object of the present invention to provide a diskette incorporating a permanent magnet generator in which leakage flux from the generator is reduced to such an extent as to prevent leakage flux from adversely affecting the IC card or magnetic card inserted into the diskette, in parallel with the generator.

It is still a further object of the present invention to provide a thin permanent magnet generator that can be incorporated in a diskette and has such a construction that dead space within the generator can be eliminated and a sufficient output can be obtained.

It is still a further object of the present invention to provide a permanent magnet generator that has a thin and easy-to-assemble construction.

It is still a further object of the present invention to provide a permanent magnet generator that can ensure smooth rotation and stable output even with a low-torque drive source, such as a 3.5" floppy disk drive, by reducing cogging torque in the generator.

A diskette incorporating a permanent magnet generator according to the present invention comprises
a diskette case and a permanent magnet generator provided in the diskette case; the permanent magnet generator comprising
  (1) a rotor having a ring-shaped permanent magnet that can rotate, together with a hub of the diskette; the permanent magnet having a plurality of rotor magnetic poles arranged on the circumferential surface thereof; the magnetic poles having alternately different polarities in the circumferential direction, and
  (2) a stator having a plurality of magnetic pole teeth made of soft magnetic material; the magnetic pole teeth
    (I) having on one end thereof stator magnetic poles that can face the aforementioned rotor magnetic poles provided on the circumferential surface via a magnetic gap,
    (II) extending outward from the stator magnetic poles, with stator coils wound thereon, and
    (III) the ends opposite to the stator magnetic poles of the stator magnetic pole teeth and the ends opposite to the stator magnetic poles of the adjoining magnetic pole teeth are connected to each other by a back yoke,
where the rotor and the stator are formed into a flat plate shape as a whole, and the thickness of the stator magnetic poles in the axial direction is smaller than the axial thickness of the permanent magnet.

The diskette, described above, incorporating a permanent magnet generator according to the present invention is desired to have such a construction that 12 to 24 magnetic poles are provided on the circumferential surface of the rotor permanent magnet at substantially equal angular intervals; each magnetic pole of the stator magnetic pole teeth being provided in such a manner as to be able to face each magnetic pole of the rotor.

The diskette, described above, incorporating a permanent magnet generator according to the present invention is desired to have such a construction that 12 to 24 magnetic poles are provided on the circumferential surface of the rotor permanent magnet at substantially equal angular intervals; each magnetic pole of the stator magnetic pole teeth being provided in such a manner as to be able to face each magnetic pole of the rotor magnetic poles, except for at least one magnetic pole.

The diskette, described above, incorporating a permanent magnet generator according to the present invention is desired to have such a construction that the magnetic pole teeth of the permanent magnet generator
  (I) have on one end thereof stator magnetic poles provided in such a manner as to face the rotor magnetic poles, except for at least one pole, and disposed at substantially equal angular intervals on the circumference thereof, except for the portion facing at least the one pole, and
  (II) extend outward from the stator magnetic poles, with stator coils wound thereon, and
  (III) the ends opposite to the magnetic poles of the magnetic pole teeth having the stator magnetic poles provided at substantially equal angular intervals are connected to each other via a back yoke made of soft magnetic material.

A diskette incorporating a permanent magnet generator according to the present invention comprises a diskette case and a permanent magnet generator provided in the diskette case;
The permanent magnet generator comprising
  (1) a rotor having a ring-shaped permanent magnet that can rotate, together with a hub of the diskette; the permanent magnet having a plurality of rotor magnetic poles arranged on the circumferential surface; the magnetic poles having alternately different polarities in the circumferential direction and
  (2) a stator having a plurality of magnetic pole teeth made of soft magnetic material; each of the magnetic pole teeth
    (I) having adjacent to one end thereof stator magnetic pole portions extending in the radial direction from the positions at which the stator magnetic poles can face the aforementioned rotor magnetic poles provided on the circumferential surface via a magnetic gap,
    (II) continuously extending outward from the stator magnetic pole portions, and having magnetic pole tooth portions on which stator coils are wound, and (III) forming at least one block, with the magnetic pole tooth portions in each block disposed in substantially parallel with each other and the adjoining stator coils disposed close to each other, and the ends opposite to the magnetic poles of the magnetic pole teeth and the ends opposite to the magnetic poles of the adjoining magnetic pole teeth connected to each other by a back yoke, wherein the rotor and the stator are formed into a flat plate shape as a whole; the thickness of the stator magnetic poles in the axial direction is smaller than the thickness of the permanent magnet in the axial direction.

The diskette, described above, incorporating a permanent magnet generator according to the present invention is desired to have at least four magnetic pole teeth in the aforementioned block.

The diskette, described above, incorporating a permanent magnet generator is desired to have such a construction that the intervals of the magnetic pole teeth disposed in substantially parallel in the aforementioned block are unequal. And the number of block can be one.

In the diskette incorporating a permanent magnet generator according to the present invention, a space for inserting a memory card can be provided within the aforementioned diskette case. In this diskette, as the space for a memory card is at least partly overlapped with the permanent magnet generator, at least part of the boundary wall may be a magnetic shield plate. Furthermore, the boundary wall may be used as a housing for the permanent magnet generator.

In the diskette incorporating a permanent magnet generator according to the present invention, any of a diskette input/output terminal, a card contact terminal, and a memory card inserting space can be provided at least partially between the stator magnetic pole teeth that are not connected to each other by a back yoke.

In the diskette incorporating a permanent magnet generator according to the present invention, a holding mechanism that can absorb the misalignment of the permanent magnet generator with respect to the diskette case can be provided within the diskette case.

The diskette incorporating a permanent magnet generator according to the present invention is desired to have such a construction that the adjoining stator magnetic poles facing the permanent magnet at the tips of the stator magnetic pole teeth are connected to each other by an inner yoke. The inner yoke connecting the adjoining stator magnetic poles at the tips of the magnetic pole teeth is desired to have a thinnest thickness at the central part between the adjoining stator magnetic poles. The inner yoke connecting the adjoining stator magnetic poles at the tips of the magnetic pole teeth is desired to be such that the cross-sectional area of the central part of the inner yoke between the adjoining stator magnetic poles is smaller than the cross-sectional area of the magnetic pole teeth.

The diskette, described above, incorporating a permanent magnet generator according to the present invention is desired to have such a construction that the hub of the permanent magnet generator can be engaged with the drive shaft of the disk drive unit.

The diskette, described above, incorporating a permanent magnet generator according to the present invention is desired to have such a construction that the diskette may be fitted to the 3.5" floppy disk drive.

The diskette, described above, incorporating a permanent magnet generator according to the present invention is desired to have such a construction that the rotor permanent magnet has the axis of easy magnetization in the radial direction. The diskette incorporating a permanent magnet generator according to the present invention is desired to have such a construction that the rotor permanent magnet has the axis of easy magnetization in the direction in which the adjoining magnetic poles of different polarities on the circumference thereof are connected. The rotor permanent magnet may be a sintered NdFeB magnet. In the diskette incorporating a permanent magnet generator according to the present invention, the rotor permanent magnet may be a permanent magnet produced by bonding powdered NdFeB using a binder.

A permanent magnet generator incorporated in a diskette according to the present invention comprises (1) a rotor having a ring-shaped permanent magnet that can rotate, together with the hub; the permanent magnet having a plurality of rotor magnetic poles arranged on the circumferential surface; these magnetic poles having alternately different polarities in the circumferential direction, (2) a stator having a plurality of magnetic pole teeth made of soft magnetic material; the magnetic pole teeth
   (I) having one end thereof stator magnetic poles that can face the rotor magnetic poles provided on the circumferential surface via magnetic gaps,
   (II) extending outward from the stator magnetic poles, with stator coils wound thereon, and
   (III) the ends opposite to the magnetic poles of the stator magnetic poles and the ends opposite to the magnetic poles of the adjoining magnetic pole teeth being connected to each other via a back yoke, wherein the rotor and the stator are formed into a flat disk shape as a whole and the thickness of the stator magnetic poles in the axial direction is smaller than the thickness of the permanent magnet in the axial direction.

The permanent magnet generator incorporated in a diskette according to the present invention is desired to have such a construction that the magnetic poles the rotor permanent magnet has on the circumferential surface thereof are disposed at substantially equal angular intervals and the number of poles is 12 to 24 poles, and the magnetic poles of the stator magnetic pole teeth are provided in such a manner as to face the rotor magnetic poles.

Alternatively, the permanent magnet generator, described above, incorporated in a diskette according to the present invention is desired to have such a construction that the magnetic poles the rotor permanent magnet has on the circumferential surface thereof are disposed at substantially equal angular intervals and the number of poles is 12 to 24 poles, and the magnetic poles of the stator magnetic pole teeth are provided in such a manner as to face the rotor magnetic poles, except for at least one pole.

The permanent magnet generator, described above, incorporated in a diskette according to the present invention is desired to have such a construction that the stator magnetic pole teeth of the permanent magnet generator (I) have on one end stator magnetic poles; the stator magnetic poles provided at substantially equal angular intervals on the circumference, except for the portions facing at least one pole, so as to face the rotor magnetic poles, except for at least one pole, (II) extend outward from the stator magnetic poles, with stator coils wound thereon, and (III) the ends opposite to the magnetic poles of the magnetic pole teeth having the stator magnetic poles provided at substantially equal angular intervals are connected to each other by a back yoke made of soft magnetic material.

A permanent magnet generator incorporated in a diskette according to the present invention comprises (1) a rotor having a ring-shaped permanent magnet that can rotate, together with the hub; the permanent magnet having a plurality of rotor magnetic poles arranged on the circumferential surface; these magnetic poles having alternately different polarities in the circumferential direction, and (2) a stator having a plurality of magnetic pole teeth made of soft magnetic material; the magnetic pole teeth
   (I) having adjacent to one end thereof stator magnetic pole portions that extend in the radial direction from the position at which the magnetic pole teeth can face the rotor magnetic poles provided on the circumferential surface via magnetic gaps,
   (II) continuously extending outward from the stator magnetic pole portions, having magnetic pole teeth portions on which stator coils are wound, and
   (III) the magnetic pole teeth combined into at least one block, with the magnetic pole teeth portions in each block being substantially parallel with each other and the adjoining stator coils being close to each other, and the ends opposite to the stator magnetic poles of the magnetic pole teeth and the ends opposite to the stator magnetic poles of the adjoining magnetic pole teeth being connected to each other by a back yoke, wherein the rotor and the stator are formed into a flat disk shape as a whole, and the thickness of the stator magnetic poles in the axial direction is smaller than the thickness of the permanent magnet in the axial direction.

The permanent magnet generator, described above, incorporated in a diskette according to the present invention is desired to have at least four magnetic pole teeth in the block.

The permanent magnet generator, described above, incorporated in a diskette is desired to have such a construction that the intervals, of the magnetic pole teeth substantially parallel with each other in the block are unequal. The number of blocks can be one.

The permanent magnet generator incorporated in a diskette according to the present invention is desired to have such a construction that the adjoining stator magnetic poles facing the rotor permanent magnet at the tips of the magnetic pole teeth are connected to each other by an inner yoke. The inner yoke connecting the adjoining stator magnetic poles at the tips of the magnetic pole teeth is desired to have a thinnest thickness at the central part between the adjoining stator magnetic poles. The inner yoke connecting the adjoining stator magnetic poles at the tips of the magnetic pole teeth is desired to be such that the cross-sectional area of the inner yoke at the central part between the adjoining stator magnetic poles is smaller than the cross-sectional area of the magnetic pole teeth. The inner yoke connecting the adjoining stator magnetic poles at the tips of the magnetic pole teeth is desired to be tapered or connected with an arc toward the thinnest part at the central part between the adjoining magnetic poles.

The permanent magnet generator, described above, incorporated in a diskette according to the present invention is desired to have such a construction that the rotor permanent magnet has the axis of easy magnetization in the radial direction.

The permanent magnet generator incorporated in a diskette according to the present invention is desired to have such a construction that the rotor permanent magnet has the axis of easy magnetization in the direction in which the adjoining magnetic poles of different polarities on the circumference are connected to each other. The rotor permanent magnet may be a sintered NdFeB magnet. In the permanent magnet generator incorporated in a diskette according to the present invention, the rotor permanent magnet may be a magnet produced by binding powdered NdFeB by a binder.

The thickness of the magnetic poles of the stator magnetic pole teeth in the axial direction is desired to be more than the thickness in which saturation is reached by the magnetic flux generated by the rotor permanent magnet. The length of the rotor permanent magnet in the axial direction is desired to be no more than 2.0 mm.

The permanent magnet generator according to the present invention is desired to have such a construction that a back yoke made of soft magnetic material having a flat contact surface in the axial direction is fixedly fitted to the axial end face of the ends opposite to the magnetic poles of the magnetic pole teeth to connect the ends opposite to the magnetic poles of the magnetic pole teeth. The back yoke is of a substantially flat ring shape, for example. The back yoke having a flat contact surface in the axial direction is desired to be fixedly fitted to each of the axial end faces of the ends opposite to the magnetic poles of the magnetic pole teeth to connect the ends opposite to the magnetic poles of the magnetic pole teeth. The back yoke may be a plate member of a U-shaped cross section that is fixedly fitted by enclosing and crimping to the radial end portion opposite to the magnetic poles of the magnetic pole teeth to connect the ends opposite to the magnetic poles of the magnetic pole teeth.

The permanent magnet generator according to the present invention may have a bearing between the facing surfaces on which the stator magnetic poles face the rotor permanent magnet. The bearing may be a roller bearing. The bearing may be a layer having a low frictional coefficient. These constructions are preferable detailed construction of the permanent magnet generator disclosed in the present invention.

The hub of the permanent magnet generator can be engaged with the drive shaft of the diskette drive unit. It is desired that a magnetic shield plate is provided at least one side surface of the permanent magnet rotor of the permanent magnet generator according to the present invention.

In a diskette incorporating a permanent magnet generator according to the present invention, the permanent magnet generator is provided in the diskette, and the back yoke is cut off at least at either place of the diskette input/output terminal or the card contact terminal.

BRIEF DESCRIPTION OF THE DRAWINGS

FIG. 2 being an exploded perspective view showing the state where the plastic case of a diskette is opened, FIG. 3 an exploded perspective view of a diskette and a permanent magnet generator, FIG. 4 an exploded perspective view in which the permanent magnet generator is further separated into elements, and FIG. 5 an enlarged exploded perspective view of the stator.

FIG. 10 is a partially enlarged view of a stator; FIG. 10A being a partial plan view showing an enclosed slot of the stator, and FIG. 10B a partial plan view showing a stator in which the angle formed by tapers provided between the yoke connecting the adjoining magnetic poles at the tips of the magnetic pole teeth.

DETAILED DESCRIPTION OF THE PREFERRED EMBODIMENTS

Figure 1A:
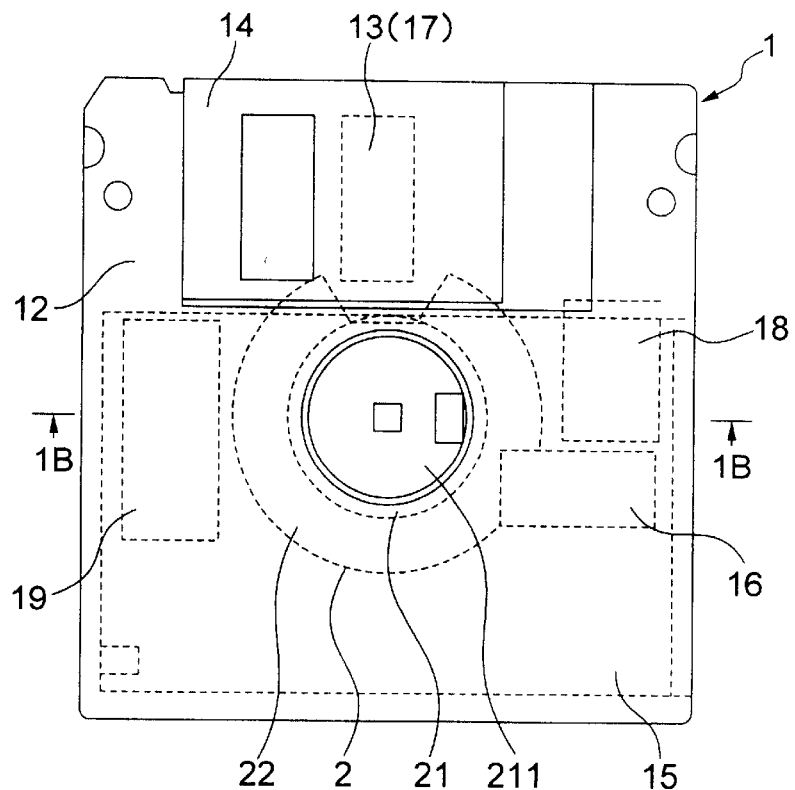
FIG. 1A being a plan (bottom) view of the diskette, FIG. 1B a cross-sectional view taken along line 1B—1B in FIG. 1A, and FIG. 1C a partially enlarged view of FIG. 1B.

In the following, a permanent magnet generator and a diskette incorporating it according to the present invention will be described, referring to the accompanying drawings.

First, the construction of a permanent magnet generator and a diskette incorporating it according to the present invention will be described. Although the following description is focused on a diskette that can be loaded on a 3.5" floppy disk drive, the present invention can be applied to a diskette of other sizes and constructions, as is evident from the following description. A 3.5" diskette (what is normally called 3.5" floppy disk) 1 has such a construction as shown in a plan (bottom) view of FIG. 1, encased in a plastic case of 94 mm in length, 90 mm in width and 3.5 mm in thickness. On one end of the case provided is a head slot 13 through which an input/output magnetic head can contact the disk. On the front end of the case provided is a sliding cover 14 that covers the head slot and can be slid open by the floppy disk drive. A hub 211 for transmitting the rotation of the drive shaft of the floppy disk drive is provided almost in the middle of the case. A floppy disk would be fitted coaxially with the hub so that it could rotate together with the hub.

In the diskette 1 incorporating the permanent magnet generator according to the present invention, a permanent magnet generator 2 is fitted around the hub 211 in the middle of the diskette 1. A rotor 21 of the generator 2 is formed by a ring-shaped permanent magnet 212 that is fitted on the outer circumference of the hub 211 and can be rotated together with the hub 211. A stator 22 of the generator 2 is provided inside the diskette 1 on the outer circumference of the rotor permanent magnet 212 with a magnetic gap between the stator and the outer circumferential surface of the permanent magnet 212. The diskette shown in the figure, which is used as an input/output device for a card having magnetic stripes (hereinafter referred to as "memory card"), such as an IC card and magnetic card, has a space 15 for inserting a memory card and a card contact terminal 16 for exchange of information with the memory card. A input/output terminal 17 for exchange of information between the diskette and the magnetic head of the floppy disk drive is provided at the head slot 13 through which the magnetic head could accesses the disk. A CPU 18 for processing information between the input/output terminal 17 and the card contact terminal 16 is provided as necessary. The permanent magnet generator 2, which is used as a drive power for driving the CPU 18 and the card contact terminal 16, requires rectification and stabilization because electric power generated by the generator may sometimes contain ripples, etc. A stabilized power supply circuit 19 is therefore incorporated in an output line of the generator 2 provided in the diskette.

The rotor 21 of the permanent magnet generator 2 is caused to rotate as the drive shaft thereof is rotated by the hub 211 that is engaged with the drive shaft of the floppy disk drive. In the case of a 3.5" floppy disk drive, the revolution of the drive shaft is normally 300 rpm. As the hub 211 is engaged with the drive shaft of the floppy disk drive in this way, the construction of the portion at which the hub 211 is engaged with the drive shaft should preferably be the same as that of the hub of a normal diskette.

FIG. 1A shows in broken lines the relative locations of the permanent magnet generator 2, the input/output terminal 17 and the card contact terminal 16. If the outer circumference of the stator yoke of the permanent magnet generator 2 assumes a perfect circle, the outer circumference of the stator yoke 221 may interfere with the input/output terminal 17 or the card contact terminal 16. To cope with this, therefore, the outer circumference of the stator yoke 221 should preferably be notched to clear these terminals.

Figure 1B:
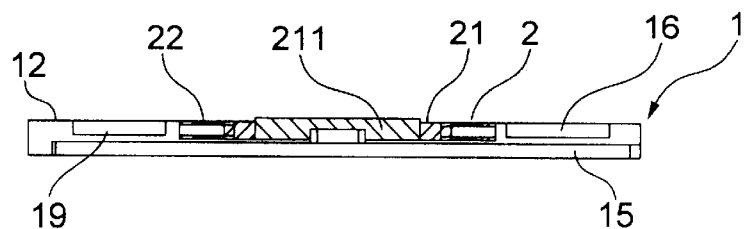
FIG. 1 shows a diskette incorporating a permanent magnet generator according to the present invention.
Figure 1C:
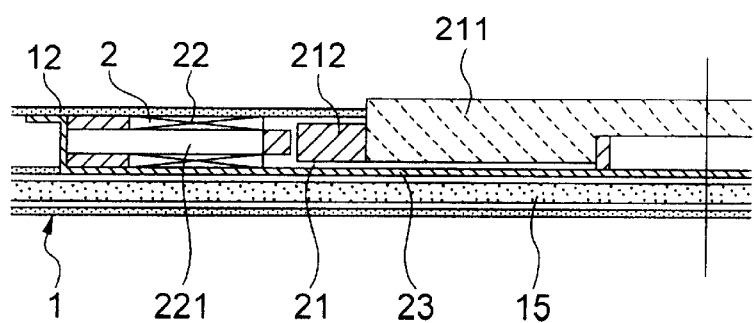

The size of the memory card is often the same as that of a normal credit card, that is, 85 mm in length, 54 mm in width and 0.8 mm in thickness. A space for accommodating this memory card provided in the diskette case 1 overlaps the permanent magnet generator 2 incorporated as shown in FIGS. 1A through 1C. Providing two (top and bottom) 0.2 mm-thick plastic case shells, and a 0.8 mm-thick memory card within a 3.5 mm-thick 3.5" diskette would leave a 2.3 mm thickness at most for the generator 2, giving some allowance for inserting and extracting the card. It follows from this that the size of the generator 2 is approx. 55 mm in outside diameter and 2 mm in thickness; the size of the rotor 21 is on the order of 30 mm in outside diameter, taking into account the hub diameter of 25 mm.

A magnetic shield should preferably be provided between the memory card insertion space 15 and the generator 2, and another magnetic shield on the back surface of the diskette case bottom shell 12 on the side on which the generator is provided. A housing 23 of the generator 2 may be made of a magnetic shield plate. The magnetic shield plate used here has a thickness of 0.2 mm at the most, preferably not more than 0.1 mm. Since leakage flux from the generator 2 outside the memory card space 15 or the diskette case 1 must be prevented with a thin magnetic shield plate, the generator 2 should preferably be of a construction causing as little leakage flux as possible. The permanent magnetic generator 2 according to the present invention involves less leakage flux because of its inner rotor type.

Although the allowable thickness of the generator 2 when a space 15 for inserting a memory card or other medium into the 3.5" diskette has been described above, there may be a case, depending on applications, where there is no need for a space 15 for a memory card or other medium in a 3.5" diskette. In such a case, the thickness of the generator 2 can be increased up to about 3 mm. When the thickness of a diskette case is a little thicker than that of the 3.5" diskette 1, 3.5 to 4.5 mm, for example, the allowable thickness of the generator 2 can be 3.5 to 4.5 mm.

Figure 2:
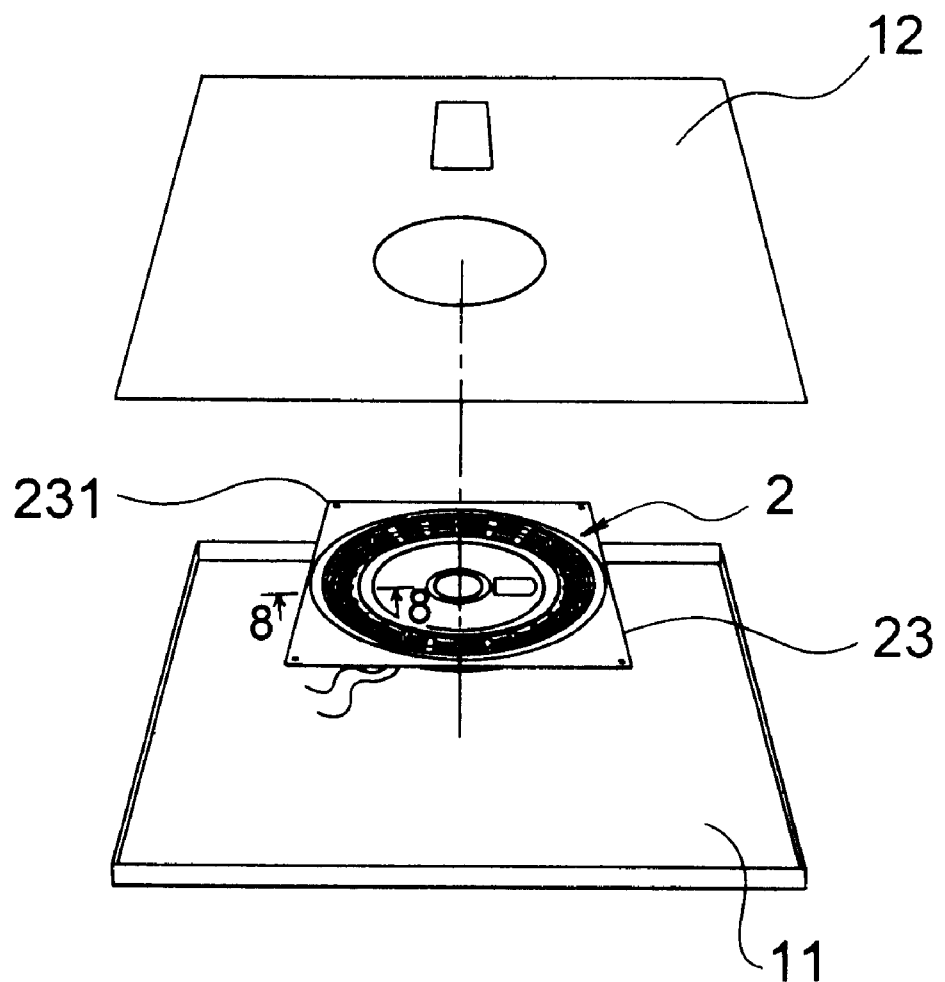
FIGS. 2 to 5 show the diskette of FIG. 1 and a permanent magnet generator incorporated therein.
Figure 3:
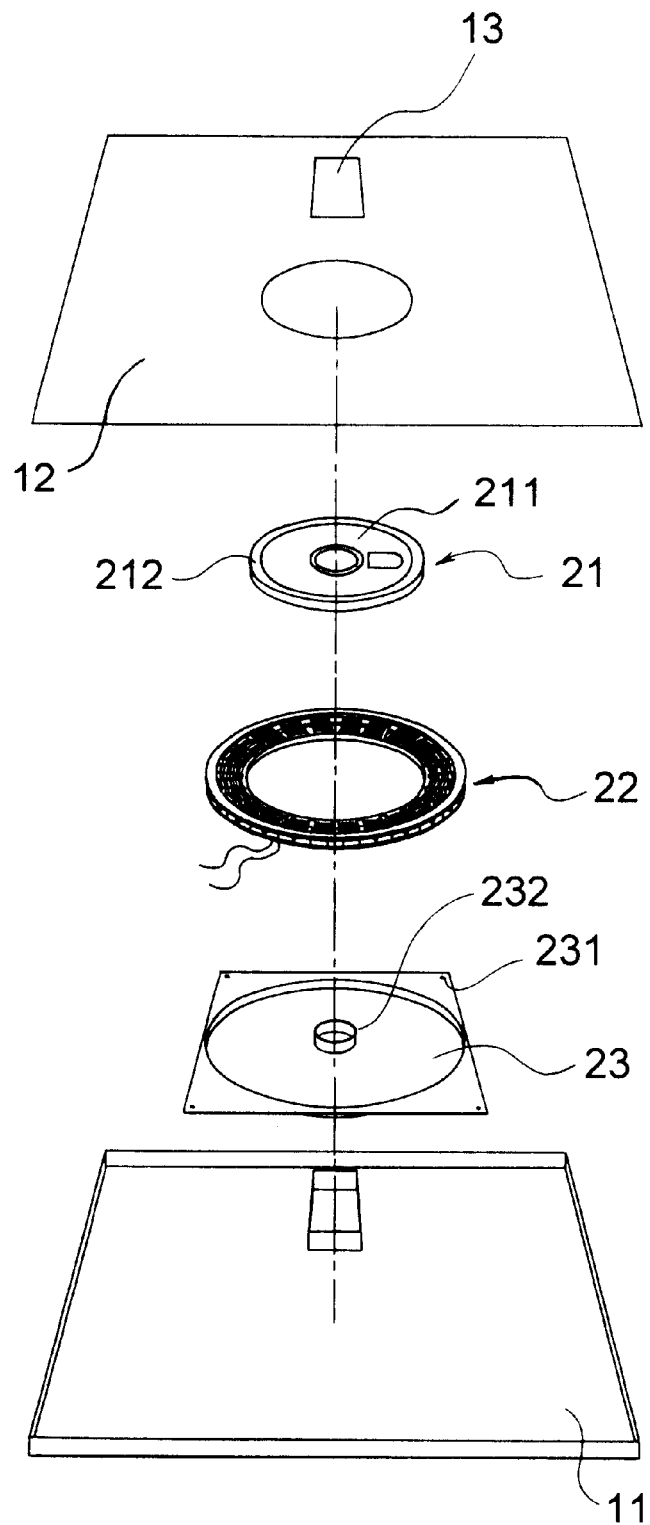
Figure 4:
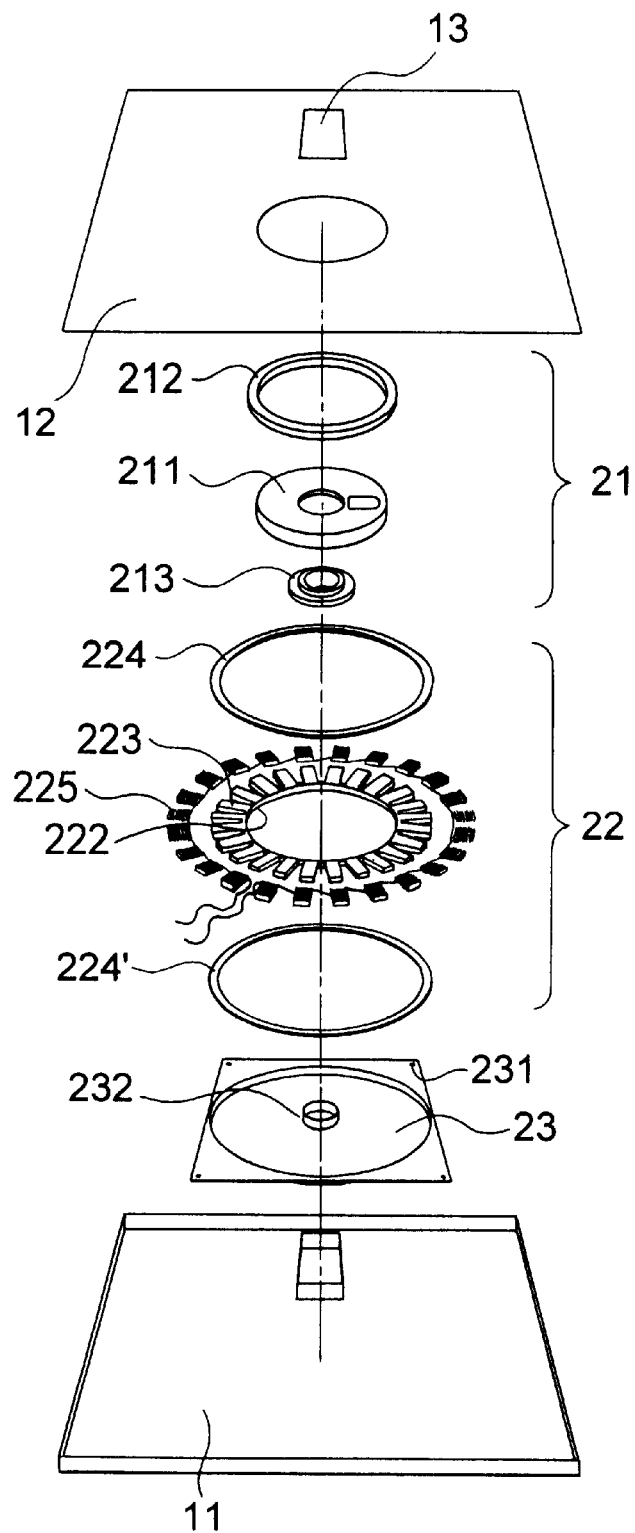
Figure 5:
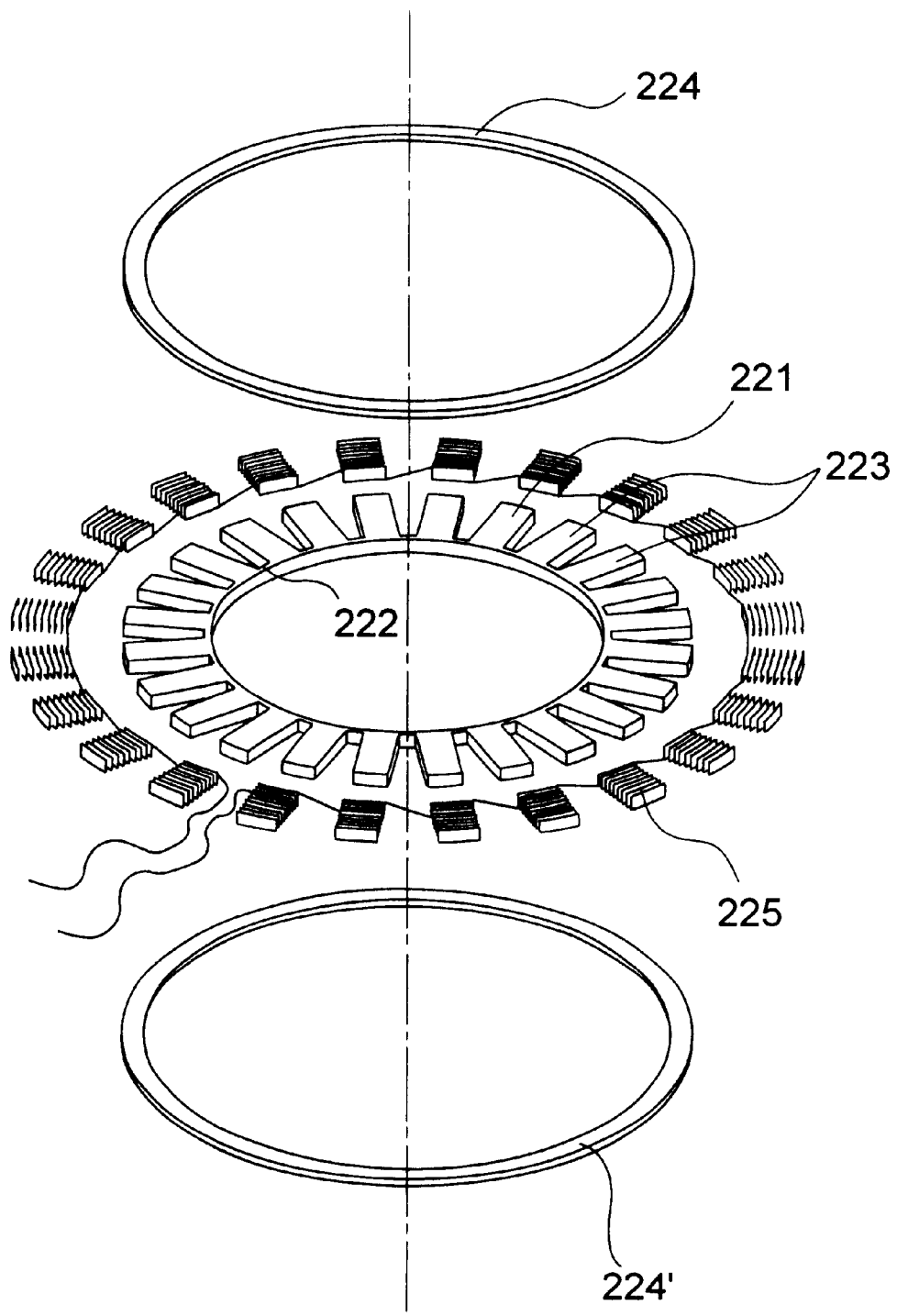

FIGS. 2 through 5 show the permanent magnet generator according to the present invention. FIG. 2 is a perspective view showing the state where a case shell of the diskette is opened. FIG. 3 is an exploded perspective view of the diskette case and the permanent magnet generator. FIG. 4 is an exploded perspective view showing the components of the permanent magnet generator in more detail. FIG. 5 is an enlarged exploded perspective view of the stator. The permanent magnet generator 2 is provided between a top shell 11 and a bottom shell 12 of the diskette case. A hub 211 of the generator 2 is provided at an opening in the middle of the bottom shell 12 of the diskette case. The generator 2 is disposed in a housing 23 made of a cup-shaped magnetic shield plate and other material. In the figure, the housing 23 is screwed to the rear side of the diskette case through screw holes 231 at the four corners thereof. The generator comprises a flat disk-shaped rotor 21 provided at the center thereof, and a flat disk-shaped stator 22 provided around the outer circumference of the rotor, with a magnetic gap with the rotor outer circumference; both the rotor and the stator forming substantially a flat disc shape as a whole. The flat disk-shaped stator 22 is fixedly fitted to the inner circumference of the housing 23. At the center of the housing 23 provided is a shaft 232 for supporting the rotor. The hub 211 of the rotor 21 is supported by an oil-impregnated bearing 213 made of sintered copper alloy so that the hub 211 can rotate with respect to the shaft 232. As described above, the hub 211 can be engaged with the drive shaft of the 3.5" floppy disk drive. The size of the hub 211 should preferably be about 25 mm in diameter. The ring-shaped permanent magnet 212 is fixedly fitted around the outer circumference of the hub 211. The permanent magnet 212 has a plurality of magnetic poles on the outer circumference thereof; the magnetic poles being arranged in alternately different polarities (i.e., NSNS—) in the circumferential direction.

The stator 22 has a plurality of magnetic pole teeth 223 provided protruding radially around a ring-shaped inner yoke 222. In other words, a stator magnetic pole located at a portion of the magnetic pole teeth 223 facing the outer circumference of the rotor is connected to its adjoining stator magnetic pole via the inner yoke 222. The cross-sectional area of the inner yoke 222 between the stator magnetic poles, however, is made smaller than the cross-sectional area of the stator magnetic pole teeth 223, so that most of the magnetic flux from the rotor 21pass through the stator magnetic pole teeth 223. These magnetic pole teeth 223 are also formed into a ring shape as a whole, and yokes 224 and 224 having a substantially flat ring-shaped end face in the axial direction are fixedly fitted to both end faces in the axial direction of the magnetic pole teeth 223. It is most desirable to provide the back yokes 224 and 224 on both end faces in the axial direction of the ends opposite to the magnetic poles of the magnetic pole teeth 223. It is quite possible, however, to provide the back yokes 224 and 224 on one side in the axial direction of the ends opposite to the magnetic poles of the magnetic pole teeth 223. Ring-shaped back yokes having a U-shaped cross section can be provided in such a manner to encircle the radial end face of the magnetic pole teeth 223.

The magnetic resistance between the back yokes 224 and 224 connecting the ends opposite to the magnetic poles of the magnetic pole teeth 223, and the magnetic pole teeth 223 must be as low as possible. In preferred embodiments of the permanent magnet generator 2 of the present invention, where a stator yoke 221 having a plurality of magnetic pole teeth 223 protruding outward from the ring-shaped inner yoke 222 is used, it is necessary to install back yokes 224 and 224 to connect the magnetic pole teeth. With this type of stator yoke 221, assembly work can be easily accomplished because a prewound stator coil 225 can be fitted from the outside of the magnetic pole teeth 223, as shown in FIG. 5. Taking into consideration the need for installing the back yokes 224 and 224 along the outer circumference of the magnetic pole teeth 223, however, it is recommended in terms of the ease of assembly to install the back yokes 224 and 224 on the end face in the axial direction of the outer circumferential edge of the magnetic pole teeth 223 after the prewound coil is fitted on the magnetic pole teeth.

Furthermore, as at least 0.2 to 0.5 $\mu$m irregularities tend to be produced on the yoke surface contacting with the end faces of the magnetic pole teeth, magnetic resistance can be reduced by increasing this contact area. To this end, it is recommended to install the back yokes on the end faces. Although a ring-shaped back yoke can be fitted to the radial end face of the magnetic pole teeth, there is the fear that the back yoke is deformed, or the inner yoke integrated with the magnetic pole teeth is deformed.

The magnetic pole teeth 223, the inner yoke 222 and the back yoke 224 of the stator 22 are all made of soft magnetic material. Since high saturation magnetic flux density Bs is desirable in reducing the cross-sectional area of parts to reduce the entire generator, soft magnetic material having a saturation magnetic flux density Bs of more than 1.2 such as soft iron, electromagnetic soft iron, dust iron core and silicon steel containing 4 to 6% Si can be used. A stator coil 225 for generating output is wound on each magnetic pole tooth 223. The generator 2 is of a flat disk shape as a whole, the thickness of which must be not more than 2 mm at the thickest. It is therefore necessary to reduce the outermost diameter of the stator coil 225 wound on the magnetic pole tooth 223, that is, the thickness in the axial direction, to not more than 2 mm.

A ring-shaped permanent magnet is desirable as a permanent magnet 212 used in the rotor 21, as noted earlier. This permanent magnet 212 is. fixedly fitted to the outer circumference of the hub 211 by adhesive, for example. This ring-shaped permanent magnet has an appropriate length in the axial length, that is, an appropriate thickness. The thickness of the permanent magnet is 2.0 mm at the maximum, the practically usable range is 0.8~2.0 mm, and the preferable thickness range is 1.0~1.9 mm. Apparently this size can vary depending on the size of diskette used, or the configuration of equipment to be incorporated together with the magnet. The permanent magnet 212 has magnetic poles exposed to the outer circumference thereof, as shown in a perspective view of FIG. 6.

Figure 7A:
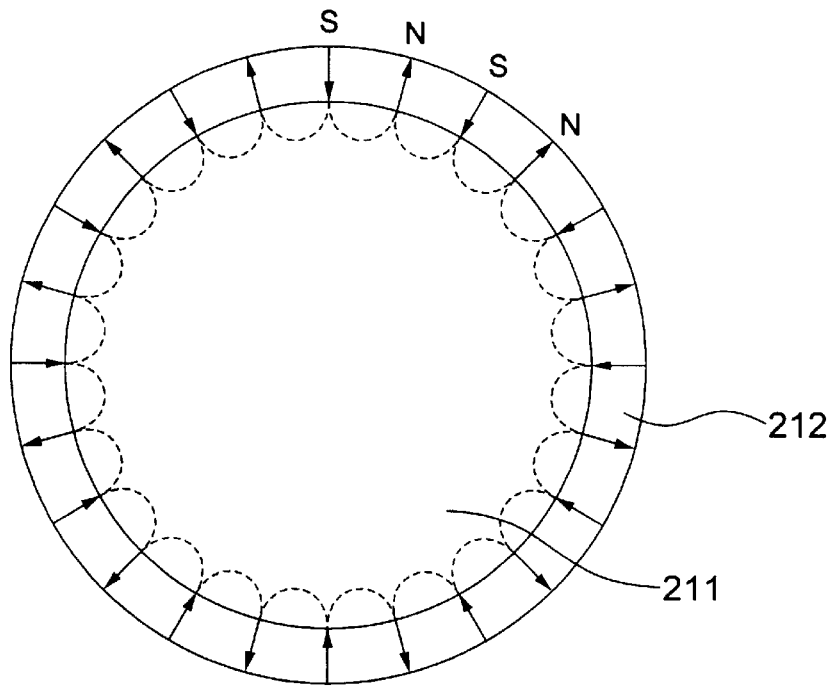
FIG. 7A is a plan view of a rotor permanent magnet having the axis of easy magnetization in the radial direction (radial anisotropy)
Figure 7B:
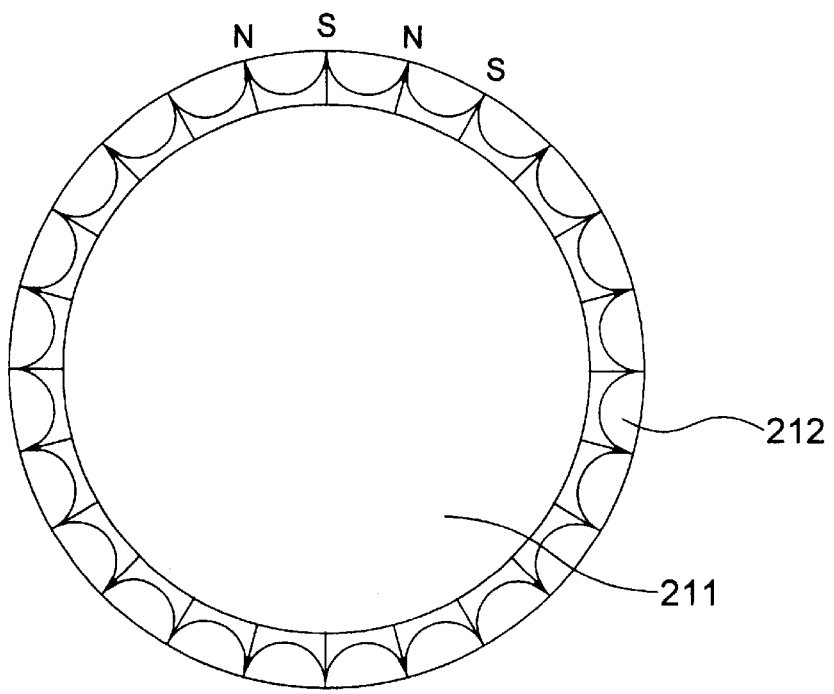
FIG. 7B is a plan view of a rotor permanent magnet having the axis of easy magnetization in the direction in which the adjoining different polarities on the circumferential surface are connected (polar anisotropy).

The thickness in the magnetizing direction of the ring-shaped permanent magnet 212 is desired to be as thick as possible in terms of magnetomotive force. With a permanent magnet having a radial anisotropy as shown in FIG. 7A, the use of a hub 211 made of ferromagnetic material can cause the magnetic lines entering in the radial direction of the magnet from the adjoining magnetic poles on the circumferential surface to connect in the hub made of ferromagnetic material to the magnetic lines entering in the radial direction from the magnetic poles of the opposite polarity. With a permanent magnet having a polar anisotropy as shown in FIG. 7B, the magnetic poles of the opposite polarity are connected to each other within the magnet by magnetic lines. In both cases, the thickness in the radial direction of the permanent magnet 212 may be thicker than 1/3~1/4 of the distance between the magnetic poles, and should more preferably be not less than 2 mm.

The material of the permanent magnet 212 should preferably be a sintered NdFeB magnet. Since the permanent magnet used in the present invention has a large demagnetizing factor due to its shape and a large inverse magnetic field is applied to the magnet, despite its relatively thin thickness (that is, relatively thin thickness in the magnetizing direction), a magnet having a large coercive force and a large magnetic flux density like a NdFeB magnet is therefore desirable. Since sintered NdFeB magnets normally have a magnetic anisotropy, the magnet used in the present invention should preferably be a magnet having the axis of easy magnetization in the radial direction, or a radial anisotropy, as shown in FIG. 7A, and a magnet having the axis of easy magnetization in the direction in which the adjoining magnetic poles of different polarities on the circumferential surface are connected, as shown in FIG. 7B. A bonded NdFeB magnet made by binding NdFeB magnet powder with plastic binder can also be used, but a bonded magnet generates less magnetic flux because it has a smaller magnet content compared with a sintered NdFeB magnet. Where only a small output is required, a permanent magnet generator made with a bonded magnet may suffice for the purpose.

Instead of NdFeB magnets, (1) nitride magnets, such as SmFeN magnets, (2) magnets containing SmFeN and α iron, often referred to as exchange spring magnets, and magnets containing NdFeB and α iron, magnets containing NdFeB and Fe3B, etc., (3) FeB, SmFeB and other HDDR (hydrogenation, decomposition, dehydration and recombination) magnets, and (4) SmCo magnets can be used, depending on required properties.

Figure 6:
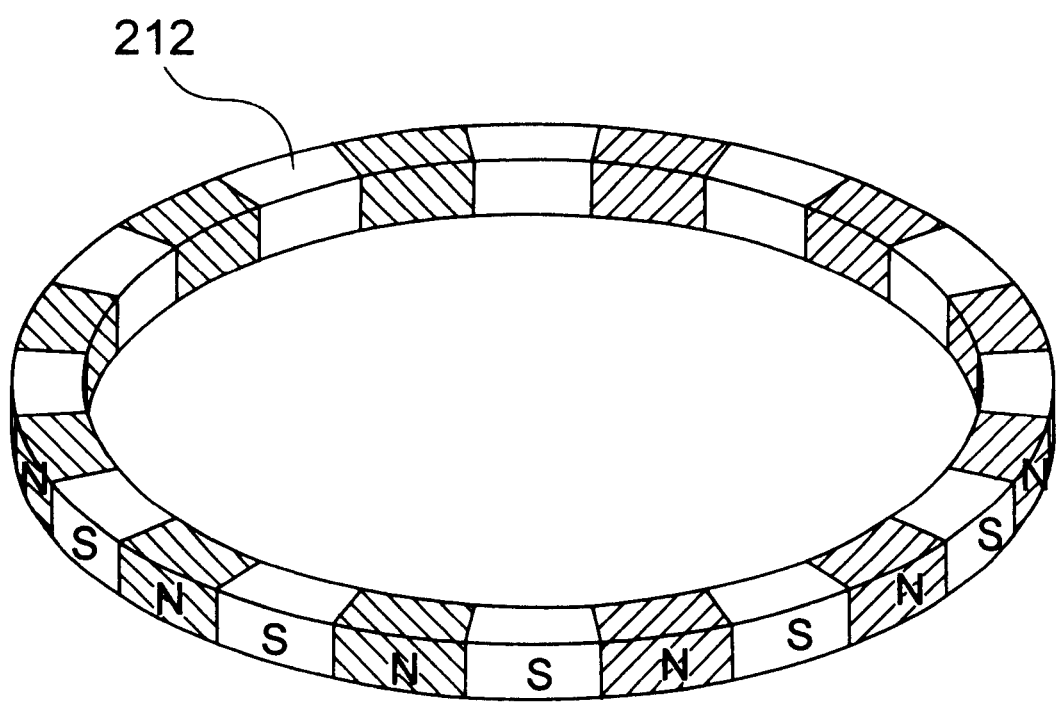
FIG. 6 is a perspective view of a rotor permanent magnet used in the permanent magnet generator of the present invention.

Although FIGS. 6 and 7A and 7B show a ring-shaped permanent magnet 212 having 24 magnetic poles on the outer circumferential surface, the number of magnetic poles in the present invention should preferably be 12 to 24 poles, and more preferably 16 to 20 poles. With decreases in the number of magnetic poles, the amount of flux per pole increases, but a generator having a permanent magnet having 16 to 24 poles generates the highest output. With increases in the number of magnetic poles, on the other hand, the space between the stator magnetic pole teeth extending outward becomes smaller, and the number of coil turns on the magnetic pole teeth is also reduced. Moreover, the manufacture of the stator becomes more difficult, and distortions are caused in the output voltage waveform. Thus, the most desirable number of magnetic poles is 16 to 20.

The number of magnetic poles of the outwardly extending stator magnetic pole teeth should preferably be the same as the number of magnetic poles of the rotor permanent magnet so that they can face each other via magnetic gaps.

Figure 8:
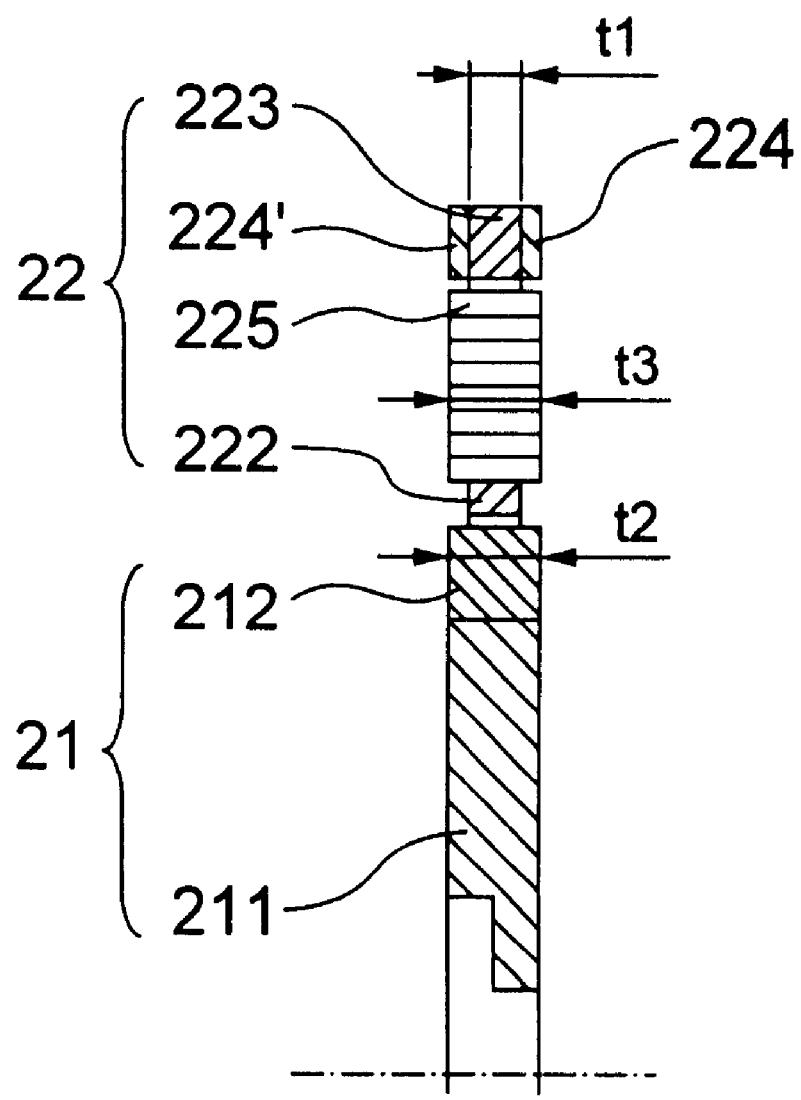
FIG. 8 is a cross-sectional view taken substantially along line 8—8 in FIG. 2, showing the relationship between the thickness in the axial direction of the stator magnetic pole teeth and the length in the axial direction of rotor permanent magnet.
Figure 15:
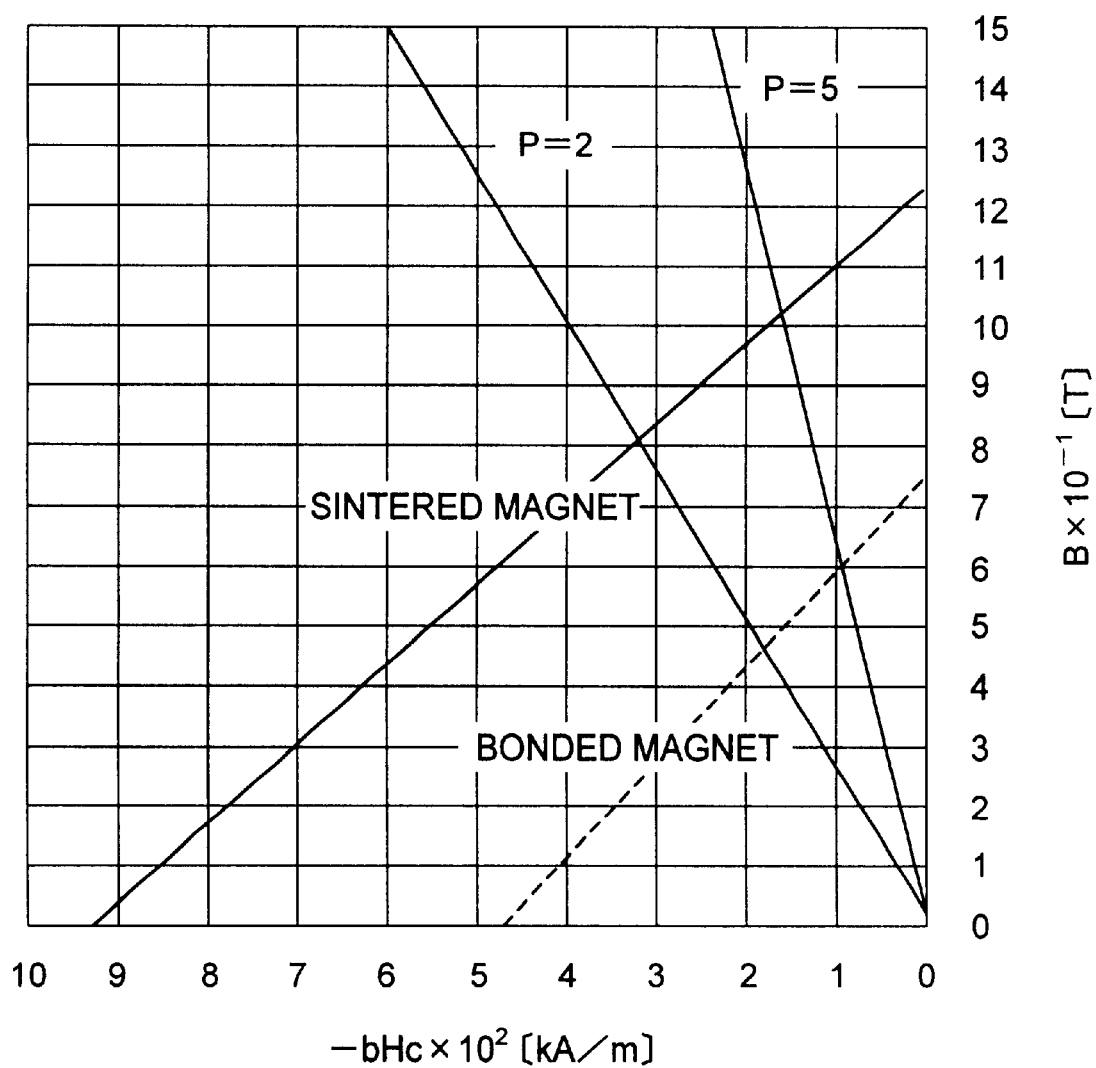
FIG. 15 is a B-H plot of permanent magnets (a sintered NdFeB and bonded NdFeB magnets) used in the present invention, with a permeance coefficient plotted.

With the same number of magnetic poles, the thickness of the magnetic poles of the outwardly extending stator magnetic pole teeth 223 must be smaller than the axial length, that is, the thickness of the permanent magnet 212. By making the thickness of the stator magnetic pole teeth 223 smaller than the thickness of the permanent magnet, a larger output can be generated by the generator 2. The thickness of magnetic poles of the stator magnetic pole teeth, however, must have a thickness enough not to be saturated by magnetic flux generated by the permanent magnet 212. FIG. 8 shows cross-sectional relationship of the stator 22 and the rotor 21 of the permanent magnet generator 2 according to the present invention, showing the thickness t1 of the outwardly extending stator magnetic pole teeth and the thickness t2 of the magnet. In the figure, t1 must be smaller than t2 (t1<t2). This is to introduce as much magnetic flux as possible into the outwardly extending magnetic pole teeth 223 constituting the stator 22, and increase the magnetic flux density in the magnetic pole teeth. When comparing the magnetic flux density of the permanent magnet 212 with the saturation magnetic flux density of the stator 22, the saturation magnetic flux density of a stator 22 made of soft magnetic material is more than 1.2 T, while even a permanent magnet 212 made of a sintered NdFeB magnet having the strongest magnetic force has a magnetic flux density of about 1.0T at the working point because its residual magnetic flux density is 1.2 to 1.3T. Since the permanent magnet used in the rotor of the permanent magnet generator in an embodiment of the present invention, which will be described later, has a permeance coefficient of 2 before incorporated into the generator, and about 5 after incorporated, its maximum magnetic flux density is 1.02T, as shown in FIG. 15. The magnetic flux density passing in the magnetic pole teeth is increased by reducing the thickness ti of the outwardly extending magnetic pole teeth 223 of the stator 22 to reduce the cross-sectional area thereof. When a sintered NdFeB magnet is used as the rotor permanent magnet and a stator 22 having a saturation magnetic flux density of more than 1.2T is used, the thickness of the magnetic pole teeth 223 should preferably be 30 to 70% of the thickness of the permanent magnet. That is, when a 1.6 mm-thick sintered NdFeB magnet is used for the rotor 21, large outputs can be obtained at t1 of 0.5 mm, 0.7 mm, and 1.0 mm, as indicated in the experiment results that will be shown later.

Figure 9A:
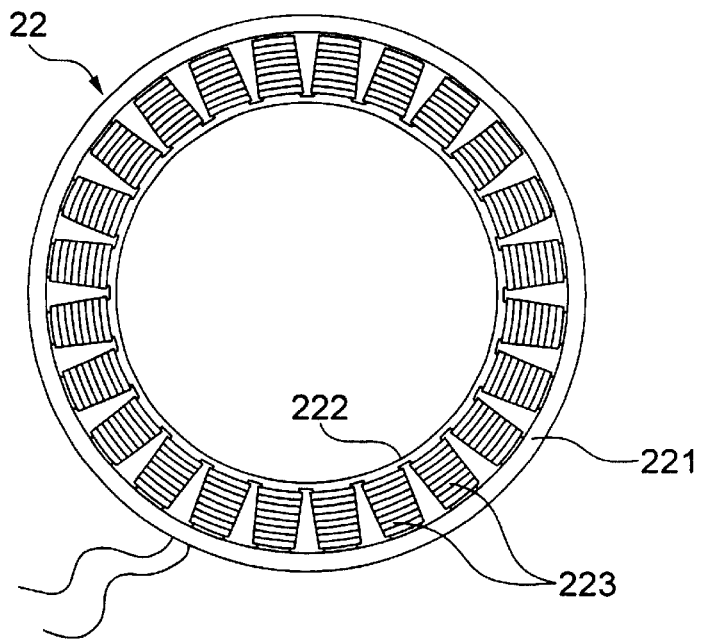
FIG. 9A is a plan view of a stator of a circular flat plate shape.
Figure 9B:
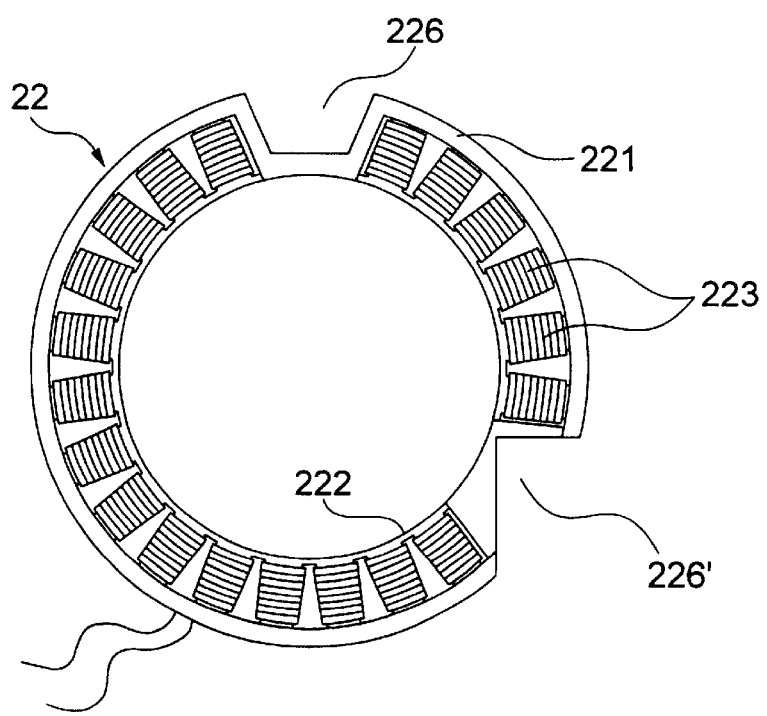
FIG. 9B is a plan view of a stator having notches.

Now, the construction of the stator 22 will be described in detail. FIG. 9A is a plan view of a stator 22 of a circular flat disk shape, and FIG. 9B shows the stator 22 having notches 226 and 226'. Outwardly extending magnetic pole teeth 223 having magnetic poles are provided at substantially equal intervals on the inner circumferential surface of the stator 22, and face the rotor permanent magnet 212 via magnetic gaps, as have already been described. Magnetic poles on the inner ends of the outwardly extending magnetic pole teeth 223 are connected to the adjoining magnetic poles by an inner yoke 222, as shown in an enlarged view of FIG. 10. In preferred embodiments of the present invention, the inner yoke 222 and the magnetic pole teeth 223 are integrally formed of a soft magnetic material. Since the cross-sectional area of the inner yoke 222 between the magnetic poles is made smaller than the cross-sectional area of the magnetic poles of the magnetic pole teeth 223, as has already been described, almost all the magnetic flux generated by the rotor 21 pass through the magnetic pole teeth. The attraction and repulsion of the magnetic poles of the stator magnetic pole teeth 223 by the magnetic poles of the rotor permanent magnet 212 become smaller because the magnetic poles of the stator magnetic pole teeth 223 are short-circuited with each other, resulting in a substantial reduction in cogging torque. The inner yoke 222 that short-circuits the adjoining magnetic poles of the stator magnetic pole teeth 223 should preferably have a thinnest thickness at the central portion between the magnetic poles. The cross-sectional area of the thinnest central portion should be smaller than the cross-sectional area of the magnetic pole teeth 223, or more preferably be not more than ⅓ of the magnetic pole teeth 223. It is more desired that the thickness be tapered or curved down from the proximal portion of the magnetic pole toward the thinnest central portion. Providing a taper or radius gradually reduces the thickness of the inner yoke from the proximal portion of the magnetic pole tooth toward the thinnest central portion, leading to a further reduction in the attraction and repulsion by the permanent magnet 212. When the "angle of tapers" as defined as the angle formed by the tapers from the proximal parts of the magnetic pole teeth down to the thinnest central portion of the inner yoke is not more than 140°, cogging torque can be reduced to a very small value.

As a stator coil 225 is wound on the outwardly extending magnetic pole tooth, electromotive force is generated in the stator coil 225 by alternating magnetic field in the magnetic pole tooth. The stator coil 225 wound on each magnetic pole tooth 223 should preferably be connected in series to each other. The desired wire diameter of the stator coil 225 is 0.1 to 0.2 mm, but the diameter of the coil 225 should be as large as practicable to minimize the electric resistance of the stator coil 225. Increasing the number of turns of the stator coil 225 as many as possible, on the other hand, is desirable to increase electromotive force. At the same time, t3 shown in FIG. 8, that is, the entire height of the stator. including the thickness of the coil 225 must be within 2.1 mm due to the requirement to limit the generator thickness to not more than 2.1 mm. Thus, the allowable coil height on the one side of the stator 22 is (t3−t1)/2 (mm). Assuming that t3 is 2.1 mm, the height of the coil 225 is (2.1−t1)/2 (mm). Since the number of turns of the coil 225 that can be wound on this thickness is determined by the diameter of the coil, the thickness t1 of the magnetic pole of the stator 22 should be as thin as possible from this point of view.

FIG. 9B is a plan view of the stator 22 having notches 226 and 226'. Where an input/output terminal 17 or a card contact terminal 16 is provided as in the case of the diskette 1 shown in FIG. 1A, these notches are provided to prevent interference between such terminals and the stator yoke 221. A notch of this type may be provided to avoid interference with the space for inserting a memory card. When these notches are provided on the stator yoke 221, the number of the stator magnetic pole teeth 223 is reduced because those magnetic pole teeth that would otherwise be provided have been replaced by the notches. The remaining magnetic pole teeth 223 are disposed at substantially equal intervals so as to face the magnetic poles of the rotor permanent magnet 212. The number of stator magnetic pole teeth 223 replaced by the notches, if any, would be at least one pole, or normally two to three poles.

Figure 11:
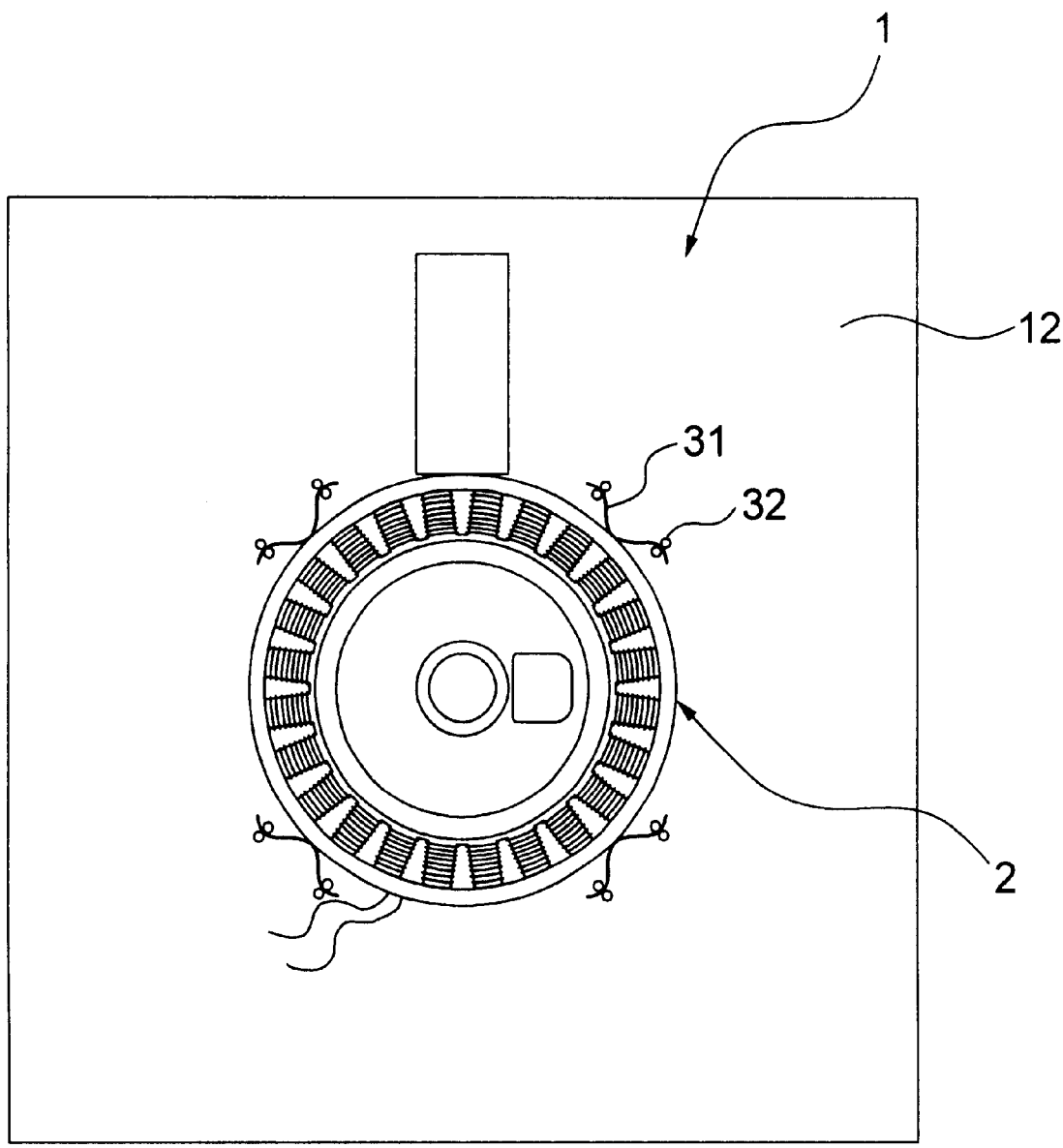
FIG. 11 is a plan view of a diskette incorporating a permanent magnet generator according to the present invention, with the cover thereof removed, showing the state where the permanent magnet generator is supported by a spring in the diskette.

In order to support the permanent magnet generator 2 according to the present invention by plastic case shells with a diskette case, a bottom shell 12 of the plastic case, for example, is formed using a somewhat thicker plate, and a housing 23 made of a cup-shaped magnetic shield can be screwed to the bottom shell 12, as shown in FIGS. 2 through 4. Where the hub 211 of the rotor 21 of the generator 2 is slightly off-center with the drive shaft of the floppy disc drive, the generator 2 must also be off-center within the diskette case 1. The generator 2 should therefore have such a construction that the generator 2 is supported by leaf springs 31, as shown in FIG. 11. In FIG. 11, four leaf springs 31 are supported by retaining pins 32 provided inside the bottom shell in the diskette to support the entire generator by the resiliency of the leaf springs 31. Even when the generator 2 is misaligned with the drive shaft by adopting such a construction, the generator 2 can be fitted to the plastic case by aligning the drive shaft.

Figure 12:
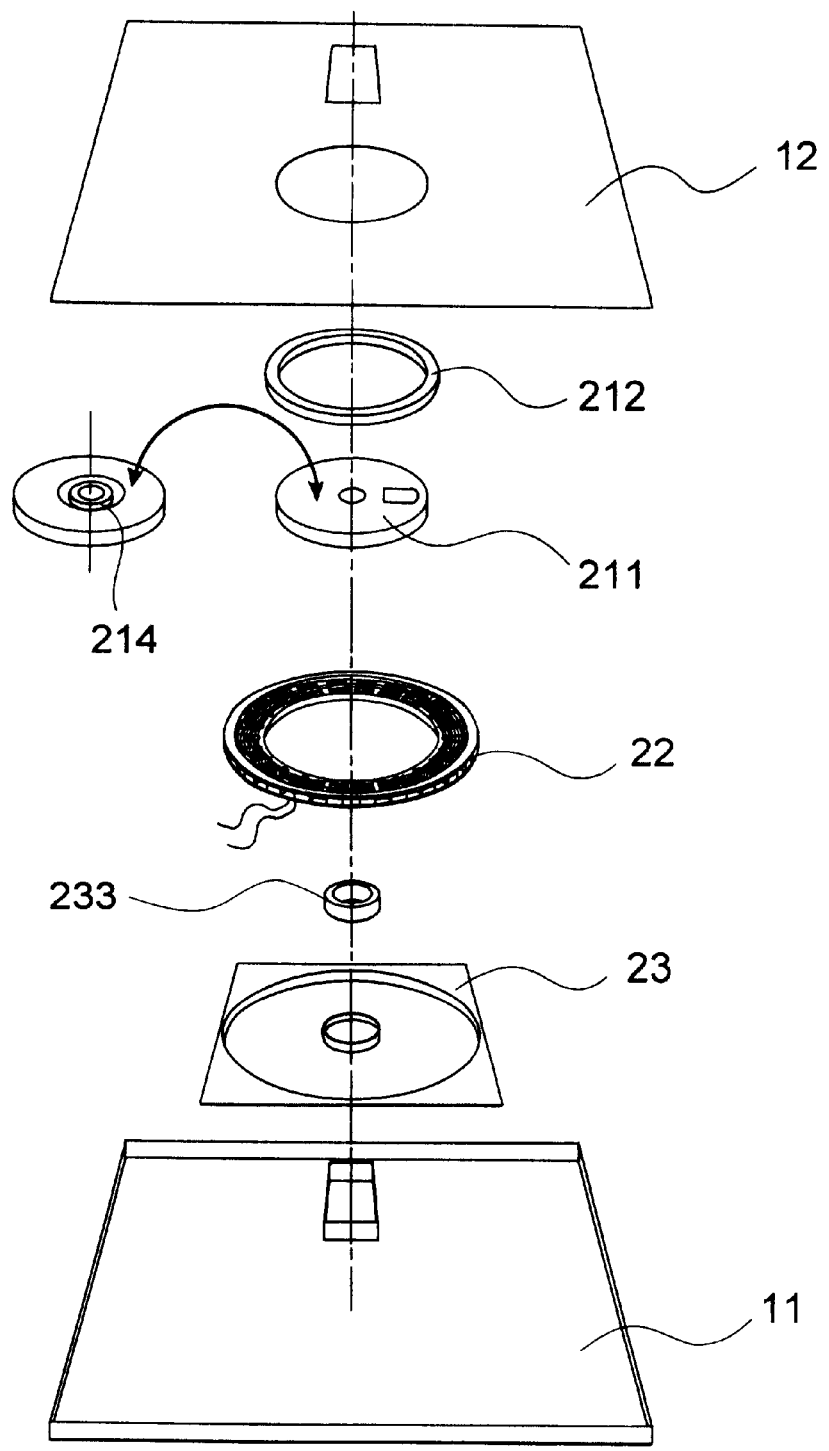
FIG. 12 is an exploded perspective view showing an embodiment of the bearing construction of a rotor.
Figure 13:
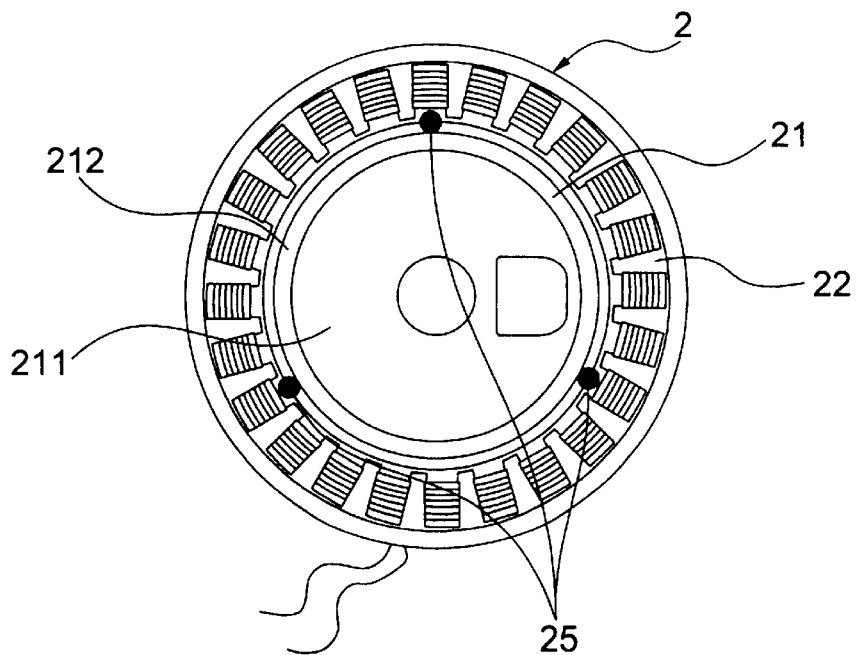
FIG. 13 is a plan view of a permanent magnet generator according to the present invention having a plain bearing provided at the portion where the permanent magnet rotor faces the stator.
Figure 14:
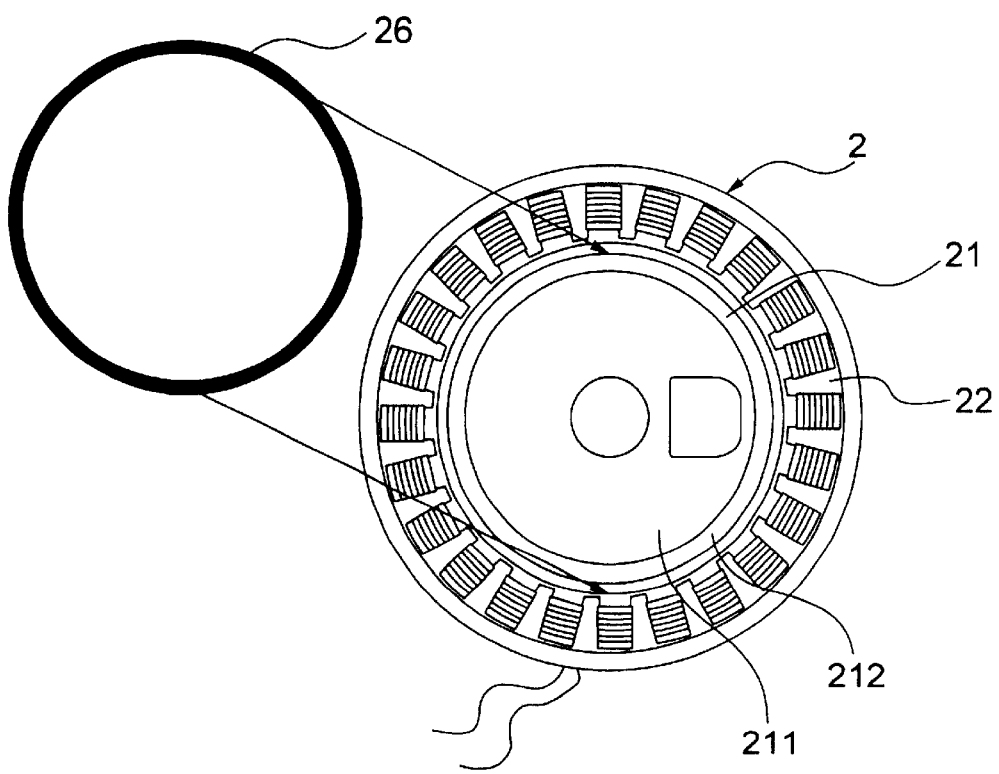
FIG. 14 is a plan view of a permanent magnet generator according to the present invention having as a bearing a layer of low frictional coefficient at the portion where the permanent magnet rotor faces the stator.

An example of the bearing construction between the rotor 21 and the stator 22 of the generator 2 is shown in FIGS. 2 through 4. In the middle of the generator housing 23 provided is a shaft 232 for supporting the rotor, which can be rotated on the shaft 232 via an oil-impregnated bearing 213 fitted to a stator hub 211. FIG. 12 shows another bearing construction where a bearing 233 is fitted in the middle of the generator housing to support a shaft 214 fitted to the rotor hub. Still another bearing construction incorporated in the permanent magnet generator 2 according to the present invention is shown in plan views of FIGS. 13 and 14. Since the construction other than the bearing section is the same as have been described earlier, description is omitted here. In the construction shown in FIG. 13, three or six roller bearings or plain bearings 25 are embedded in the portion at which the stator faces the rotor. FIG. 14 shows the construction where a lubricating layer 26 having a low friction coefficient is provided as a bearing at the portion where the stator faces the rotor.

EXPERIMENTS

The permanent magnet generator according to the present invention will be described in detail, referring to the experiments shown below, together with requirements for implementing the present invention.

Experiment 1

In the permanent magnet generator manufactured based on the design specifications shown in Table 1, the rotor magnetic poles and the stator magnetic poles were changed from 12 poles to 24 poles. At the same time, the axial thickness t1 of the stator magnetic poles was changed from 0.5 mm to 1.6 mm.

TABLE 1

| Item | Specification |
| --- | --- |
| Size of generator | Outside diameter 55 mm × thickness 2 mm |
| Size of rotor | Outside dia. 30 mm × inside dia. 25 mm × thick. 1.6 mm |
| Permanent magnet | Sintered NdFeB radial anisotropic permanent magnet (B-H curve is shown by solid lines in FIG. 15) |
| No. of rotor poles | 12~24 poles |
| Material of stator | Cold-rolled steel sheet SPCC Saturation flux density Bs: 1.5 T |
| No. of stator poles | 12~24 poles |
| Stator winding | No. of winding turns: 55 turns/pole Wire dia.: 0.1 mm Wire resistance: 24.5 Ω (18 poles) Series connection |
| Inner yoke | Min. thickness (radial)/magnetic pole tooth width: 0.5 mm/3 mm Angle of tooth tapers: 180° |
| Magnetic gap | One side: 0.3 mm |
| Revolution | 300 rpm |

Figure 16:
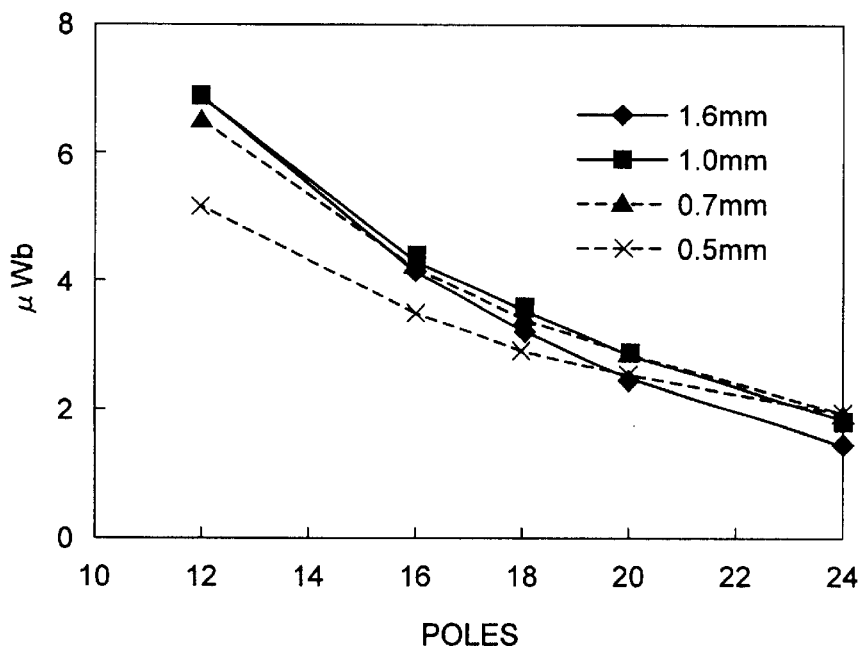
FIG. 16 is a graph showing changes in the amount of flux per pole when the number of poles was changed in a permanent magnet generator according to the present invention in which a sintered NdFeB radial anisotropic permanent magnet was used as the rotor permanent magnet, with the thickness of the stator as a parameter.

FIG. 16 is a graph in which the amount of magnetic flux per pole in the permanent magnet generator manufactured in this way was plotted, with the thickness of the stator magnetic poles as a parameter, by changing the number of poles from 12 poles to 24 poles. With any thicknesses of the stator magnetic pole teeth, the amount of magnetic flux per pole increased as the number of poles was reduced, while the amount of magnetic flux per pole decreased as the number of poles was increased. That with smaller numbers of poles, the amount of flux in the graph for a thickness as thin as 0.5 mm was smaller than that in the graphs for other thicknesses is attributable to the fact that saturation was reached in the magnetic pole teeth. With larger numbers of magnetic poles, on the other hand, the amount of magnetic flux increased for thinner magnetic poles.

Figure 17:
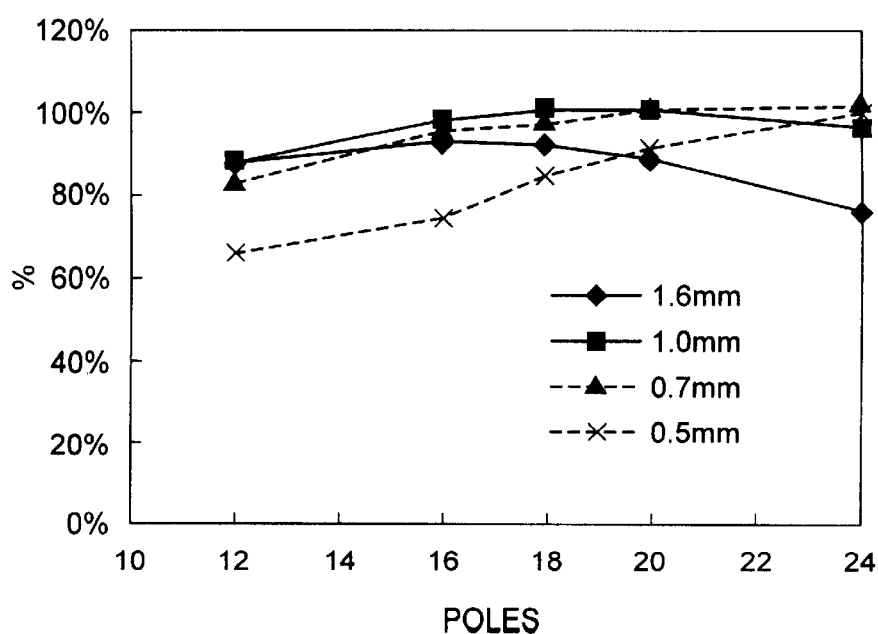
FIG. 17 is a graph showing relative output voltages when the number of poles was changed in the same generator as used in FIG. 16, with the thickness of the stator as a parameter (with the number of coil turns per stator magnetic pole unchanged), against the output voltage of 100% for a permanent magnet generator of 20 poles and the stator thickness of 1.0 mm.
Figure 18:
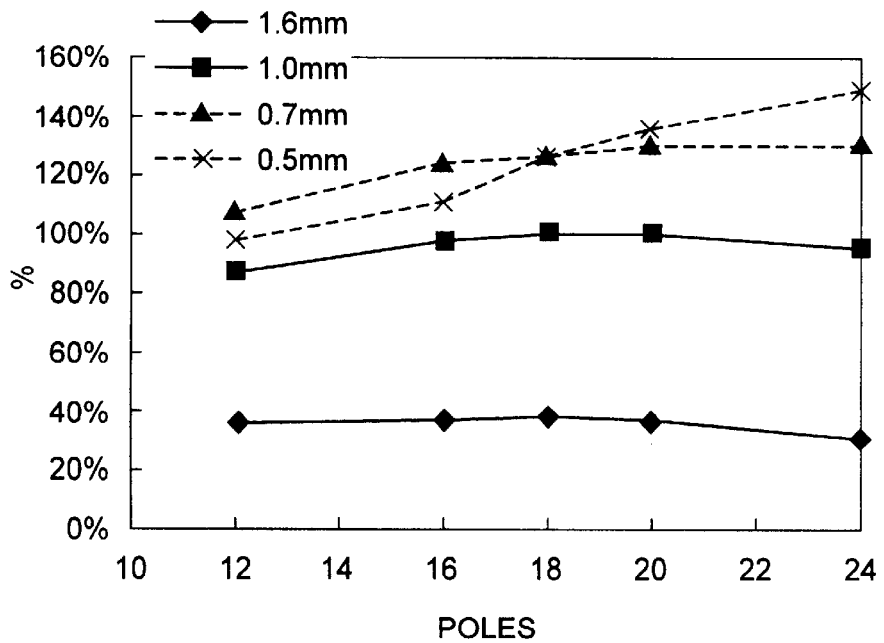
FIG. 18 is a graph showing relative output voltages when the number of poles was changed in the same generator as used in FIG. 16, with the thickness of the stator as a parameter (by changing the number of coil turns per stator magnetic pole in accordance with the stator space), against the output voltage of 100% for a permanent magnet generator of 20 poles and the stator thickness of 1.0 mm.

FIG. 17 shows measurement results of the relative output voltages of this generator obtained when output voltage with a 20-pole, 1.0 mm-thick stator was set to 100%, with the number of coil turns kept constant. FIG. 18 shows measurement results of relative output voltages obtained by changing the number of coil turns. In FIG. 18, too, the output voltages of the generator are shown, when a generator having 20 magnetic poles and a 1.0 mm-thick stator was set to 100%. Since the space for the coil excluding the thickness t1 of the stator magnetic pole teeth was (2−t1)/2 (mm) on one side, as described referring to FIG. 8, the number of coil turns was obtained by multiplying a parameter allowing for the space. In other words, what was obtained by multiplying the relative output voltage of FIG. 17 with the number of coil turns was the output voltages of the generator when the number of coil turns was changed, as shown in FIG. 18. Since the space for the coil when t1=1.0 mm was ½ (mm), this value was used as the reference value. Thus, the ratio of the space when the thickness of the magnetic pole teeth was t1 to the reference value was (2−t1)/1. The results obtained by multiplying this as a parameter are shown in FIG. 18.

As is evident from FIGS. 17 and 18, large outputs were obtained when the thickness of the magnetic pole teeth was 0.5 mm, 0.7 mm and 1.0 mm, and the number of poles is desirable to be 16 to 20 poles.

Experiment 2

Figure 19:
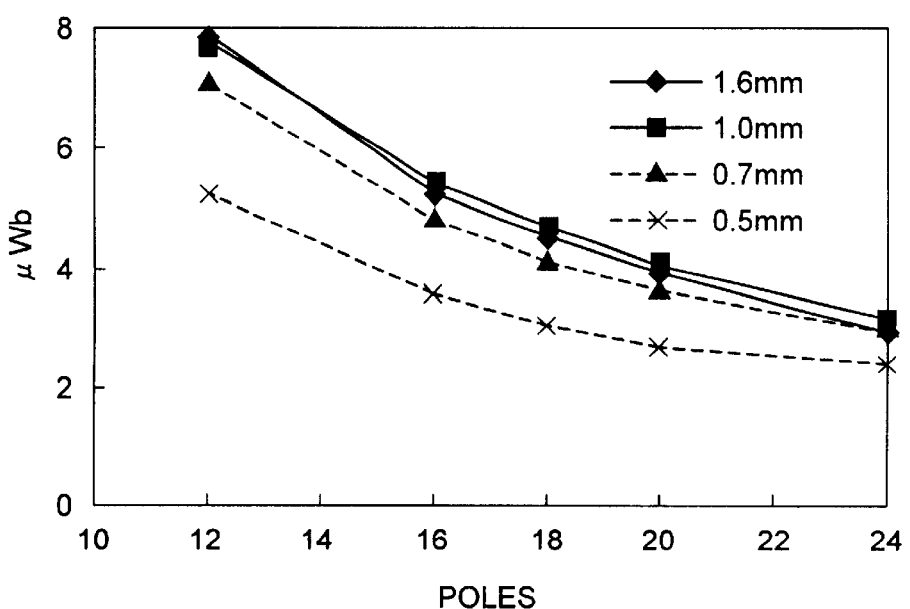
FIG. 19 is a graph showing changes in the amount of flux per pole voltages when the number of poles was changed in a permanent magnet generator according the present invention in which a sintered NdFeB polar anisotropic permanent magnet was used as the rotor permanent magnet, with the thickness of the stator as a parameter.
Figure 20:
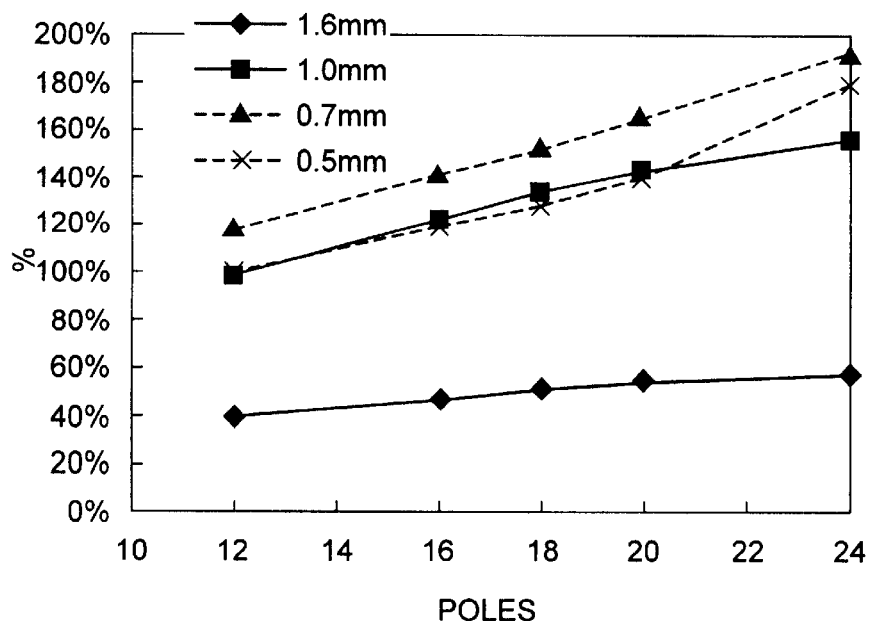
FIG. 20 is a graph showing relative output voltages when the number of poles was changed in the same generator as used in FIG. 19, with the thickness of the stator as a parameter (by changing the number of coil turns per stator magnetic pole in accordance with the stator space), against the output voltage of 100% for a permanent magnet generator of 20 poles and the thickness of the stator of 1.0 mm, in which a sintered NdFeB radial anisotropic permanent magnet was used.
Figure 21:
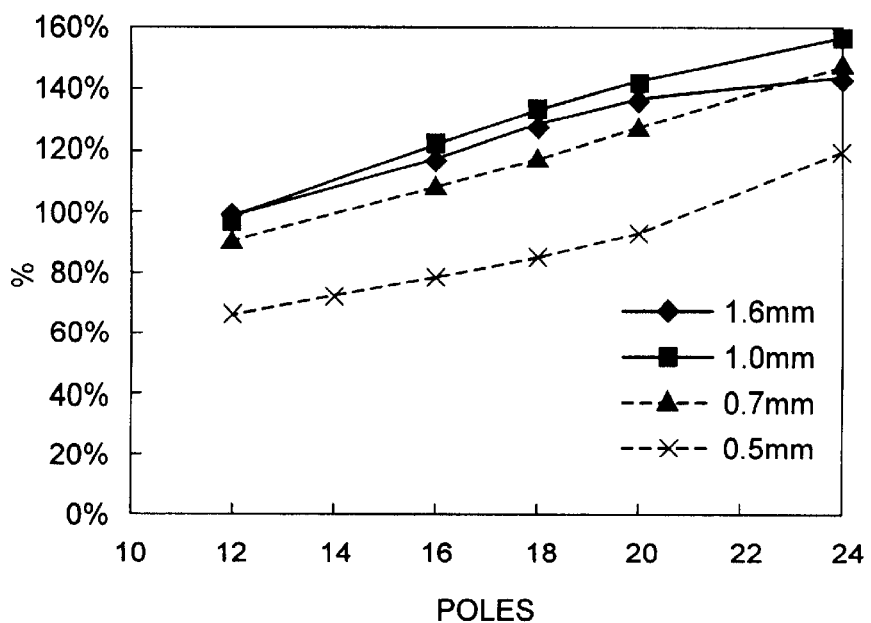
FIG. 21 is a graph showing relative output voltages when the number of poles was changed in the same generator as used in FIG. 19, with the thickness of the stator as a parameter (with the number of coil turns per stator magnetic pole unchanged), against the output voltage of 100% for a permanent magnet generator of 20 poles and the thickness of the stator of 1.0 mm, in which a sintered NdFeB radial anisotropic permanent magnet was used.

The same permanent magnet generator as used in Experiment 1 was used, except that a sintered NdFeB polar anisotropic permanent magnet was used as the rotor permanent magnet. FIGS. 19, 20 and 21 show measurement results of relative output voltages when the amount of flux per pole and the number of coil turns were changed, and relative output voltages when the number of coil turns was kept constant. FIGS. 20 and 21 show the relative output voltages to a permanent magnet generator in which a sintered NdFeB radial anisotropic permanent magnet was incorporated and the output voltage with a 1.0 mm-thick 20-pole stator was set to 100%.

Though the B-H curve is not shown in the figure because it cannot be measured with the polar anisotropic permanent magnet, FIG. 19 reveals that the amount of flux was substantially improved compared with that in FIG. 16, indicating that magnetic characteristics were improved compared with the radial anisotropic permanent magnet. When the thickness of the magnetic pole teeth was 0.5 mm, the amount of flux increased only moderately due to saturated magnetic pole teeth, as seen in FIG. 16. When the thickness of the magnetic pole teeth was 0.7 to 1.6 mm, the amount of flux increased by about 10%. The output voltage increased with the magnetic pole teeth thicknesses of 0.5 mm, 0.7 mm and 1.0 mm, and with the numbers of poles of 16 through 24 poles.

Experiment 3

Figure 22:
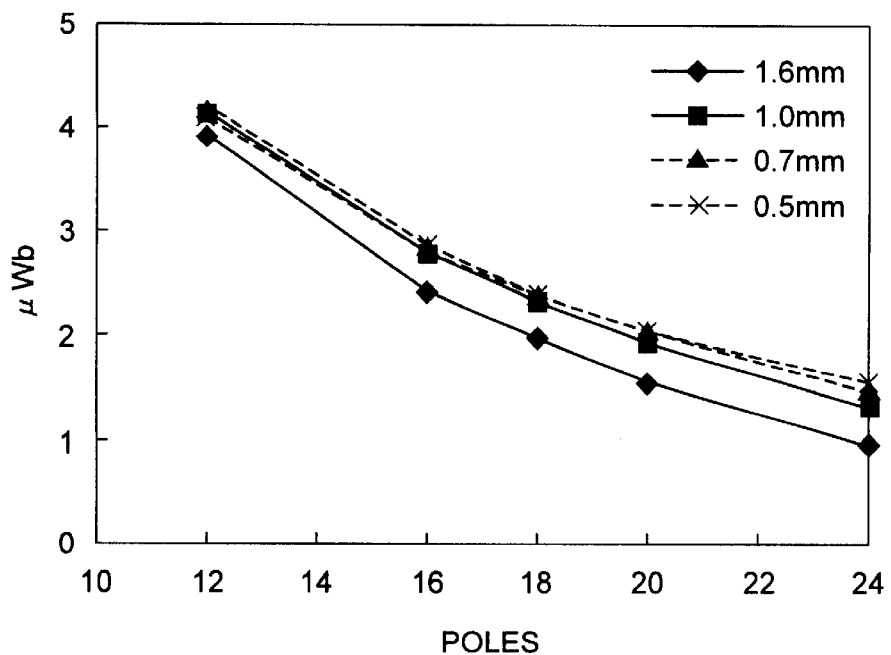
FIG. 22 is a graph showing changes in the amount of flux per pole when the number of poles was changed in a permanent magnet generator according to the present invention in which a bonded NdFeB permanent magnet was used as the rotor permanent magnet, with the thickness of the stator as a parameter.
Figure 23:
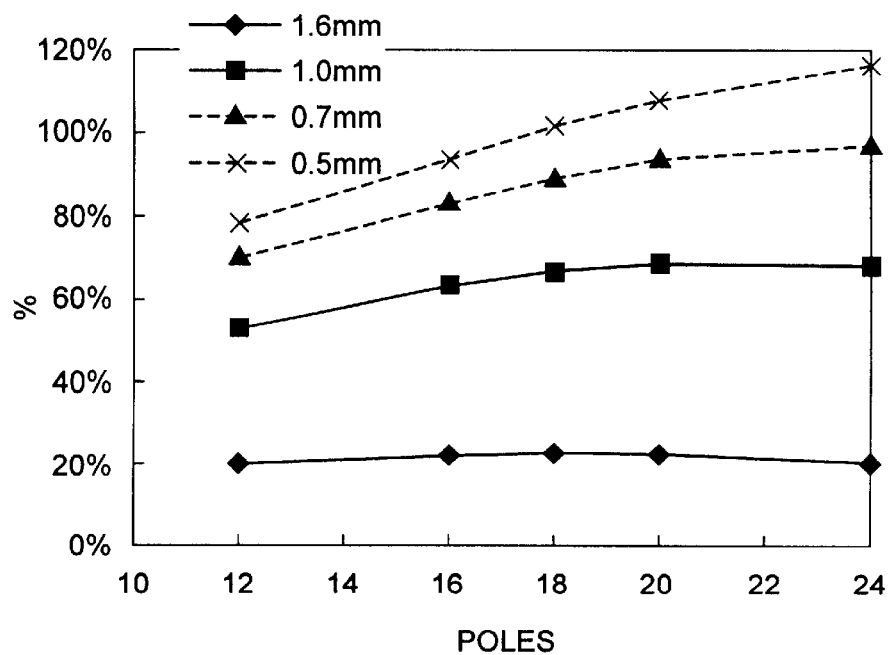
FIG. 23 is a graph showing relative output voltages when the number of poles was changed in the same generator as used in FIG. 22, with the thickness of the stator as a parameter (by changing the number of coil turns per stator magnetic pole in accordance with the stator space), against the output voltage of 100% for a permanent magnet generator of 20 poles and the thickness of the stator of 1.0 mm, in which a sintered NdFeB radial anisotropic permanent magnet was used.
Figure 24:
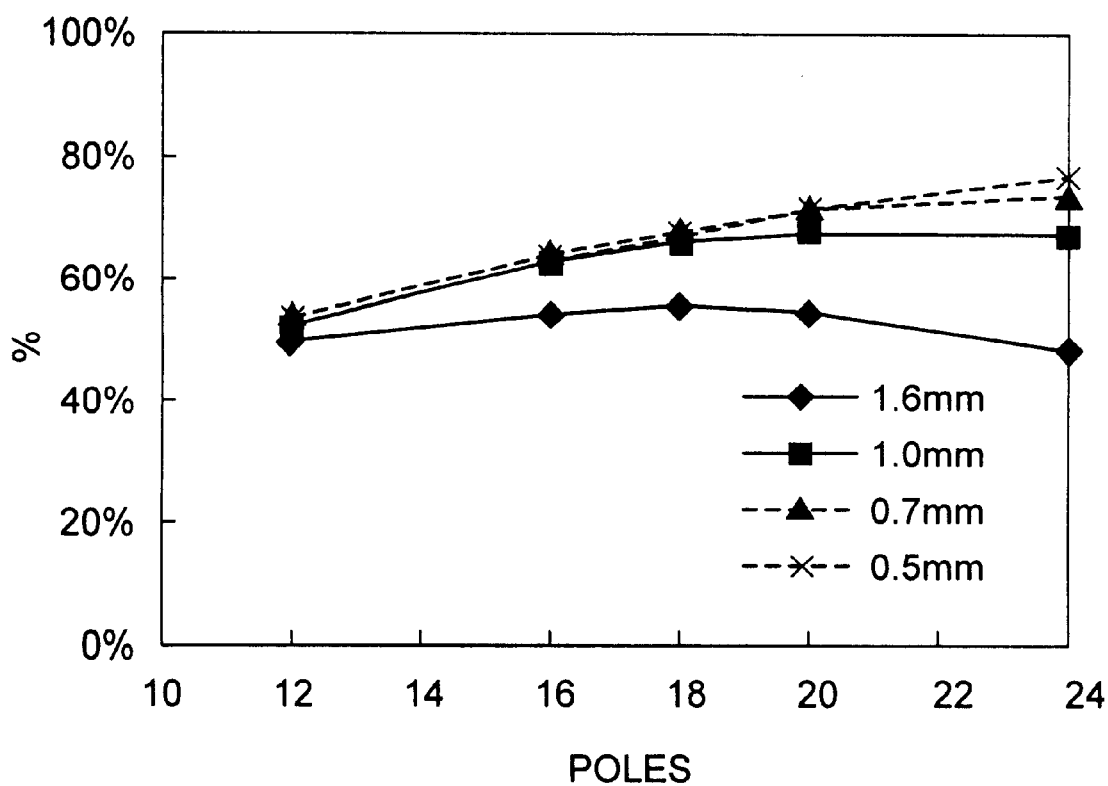
FIG. 24 is a graph showing relative output voltages when the number of poles was changed in the same generator as used in FIG. 22, with the thickness of the stator as a parameter (with the number of coil turns per stator magnetic pole unchanged), against the output voltage of 100% for a permanent magnet generator of 20 poles and the thickness of the stator of 1.0 mm, in which a sintered NdFeB radial anisotropic permanent magnet generator was used.

The same permanent magnet generator as used in Experiment 1 was used, except that a bonded NdFeB permanent magnet was used as the rotor permanent magnet. FIGS. 22, 23 and 24 show measurement results of relative output voltages when the amount of flux per pole and the number of coil turns were changed, and relative output voltages when the number of coil turns was kept constant. FIGS. 23 and 24 shows the relative output voltages to a permanent magnet generator in which a sintered NdFeB radial anisotropic permanent magnet was incorporated and the output voltage with a 1.0 mm-thick 20-pole stator was set to 100%.

The B-H curve of this bonded permanent magnet is shown by broken lines in FIG. 15 where the residual magnetic flux density was about 0.75T, 60% of the sintered radial anisotropic permanent magnet. The amount of magnetic flux per pole shown in FIG. 22 was about 60% of that shown in FIG. 16. Since magnetic saturation of magnetic pole teeth did not occur even with the magnetic pole teeth thickness of 0.5 mm, the amount of flux with 12 poles remained almost the same as that with the magnetic pole teeth thicknesses of 1.0 mm and 0.7 mm.

As seen in FIG. 23, the number of coil turns can be increased when the number of magnetic pole teeth is 0.5 mm. The drop in relative output voltage as compared with Experiments 1 and 2 was not so large. Thus, the figure reveals that considerable output can be obtained even with a bonded magnet by reducing the thickness of the magnetic pole teeth. The use of a lightweight, easy-to-machine bonded magnet could offer great advantage in practical applications.

Experiment 4

Two units of permanent magnet generators were manufactured based on the design specifications shown in Experiment 1 and the additional specifications shown in Table 2 below, using a sintered NdFeB radial anisotropic permanent magnet used in Experiment 1 and a sintered NdFeB polar. anisotropic permanent magnet used in Experiment 2.

TABLE 2

| Item | Specifications |
|---|---|
| Permanent magnet | Sintered NdFeB radial anisotropic permanent magnet |
|  | Sintered NdFeB polar anisotropic permanent magnet |
| No. of rotor poles | 20 |
| No. of stator poles | 18 (two poles replaced with notches) |
| Thick. of stator | 1.0 mm |
| No. of coil turns | 1100 |
|  | Wire dia.: 0.10 mm, resistance: 24.5 Ω |
| Peak voltage | 1.2 V |

Figure 25:
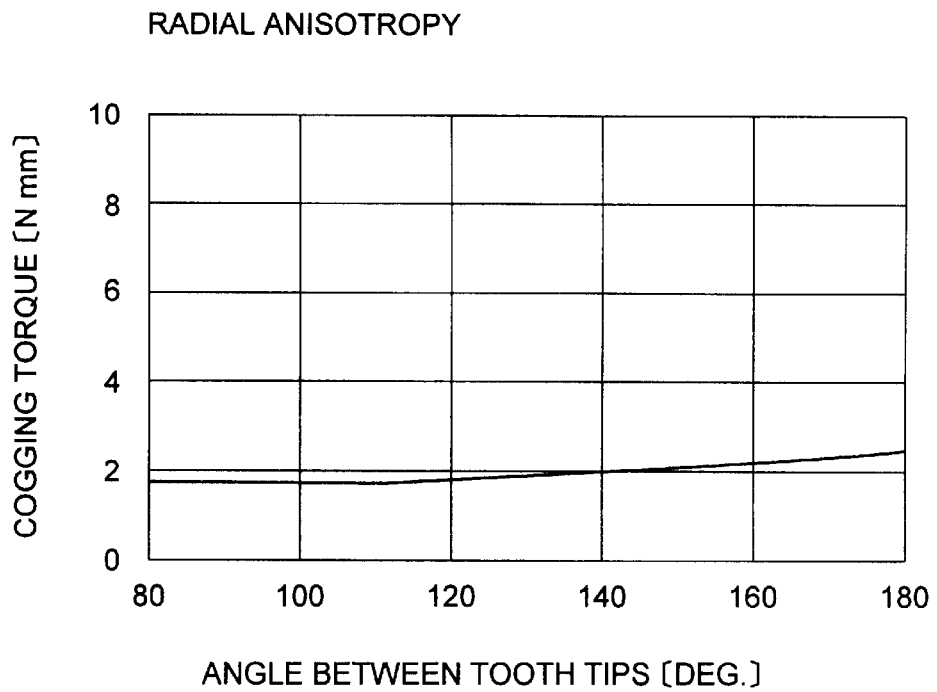
FIG. 25 is a graph showing the relationship between cogging torque and the angle of the inner yoke teeth in a permanent magnet generator according to the present invention using a sintered NdFeB radial anisotropic permanent magnet.
Figure 26:
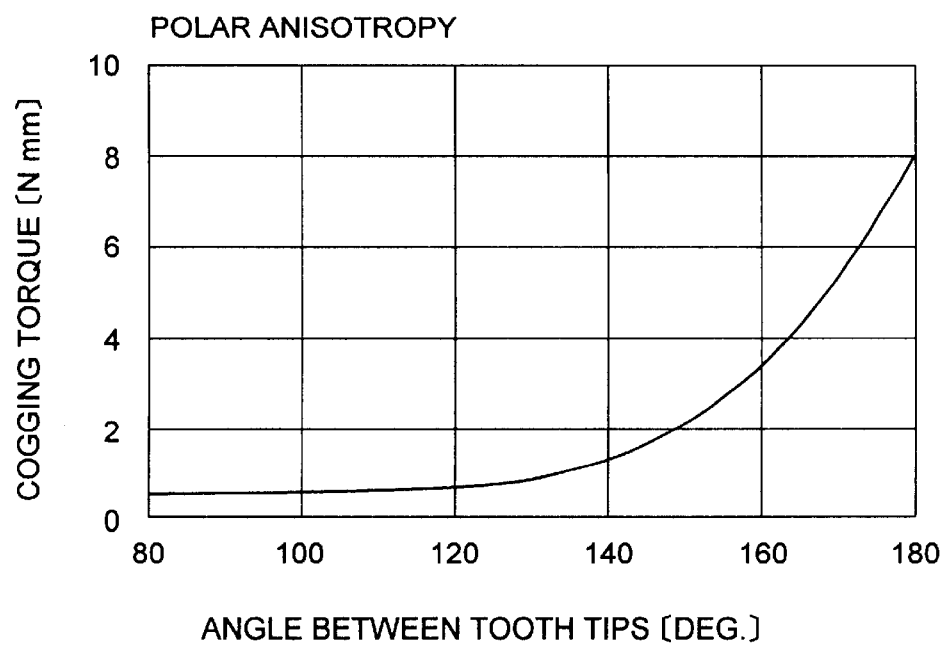
FIG. 26 is a graph shown the relationship between cogging torque and the angle of the inner yoke teeth in a permanent magnet generator according to the present invention using a sintered NdFeB polar anisotropic permanent magnet.

The inner yoke connecting the adjoining magnetic poles on the stator magnetic pole teeth in the permanent magnet generator has the thinnest thickness at the central parts between the magnetic poles, as shown in FIG. 10B. In the permanent magnet generators used in Experiment 4, the thinnest thickness (the thickness in the radial direction) at the central part between the magnetic poles was 0.5 mm, and tapers were provided from the proximal parts of the magnetic pole teeth toward the thinnest central part. Changes in cogging torque (the peak-to-peak torque, that is, the sum of attraction and repulsion) were measured by changing the angle formed by the tapers from 80 degrees to 180 degrees, and shown in FIG. 25 where a sintered NdFeB radial anisotropic permanent magnet was used, and in FIG. 26 where a sintered NdFeB polar anisotropic permanent magnet was used. As is evident from these figures, cogging torque was small in either case when the angle of tapers was not more than 140°. With the radial anisotropic permanent magnet, cogging torque was small even at the angle of taper of 180°. With the polar anisotropic permanent magnet, on the other hand, cogging torque sharply rose as the angle of tapers was increased and reached about 140°. This is attributable to the improvement in magnetic force resulting from a very strong orientation caused at the magnetic pole portion of the polar anisotropic permanent magnet. It is generally believed that there is no problem so long as the drive torque of the 3.5" floppy disk drive is not more than 2.5 Nmm. Consequently, the permanent magnet generator in which the radial anisotropic permanent magnet is used causes no problem at any angles of tapers. The generator in which the polar anisotropic permanent magnet is used, on the other hand, can serve the purpose if the angle of taper is about 160°, and more preferably not more than 140°.

Experiment 5

Figure 27:
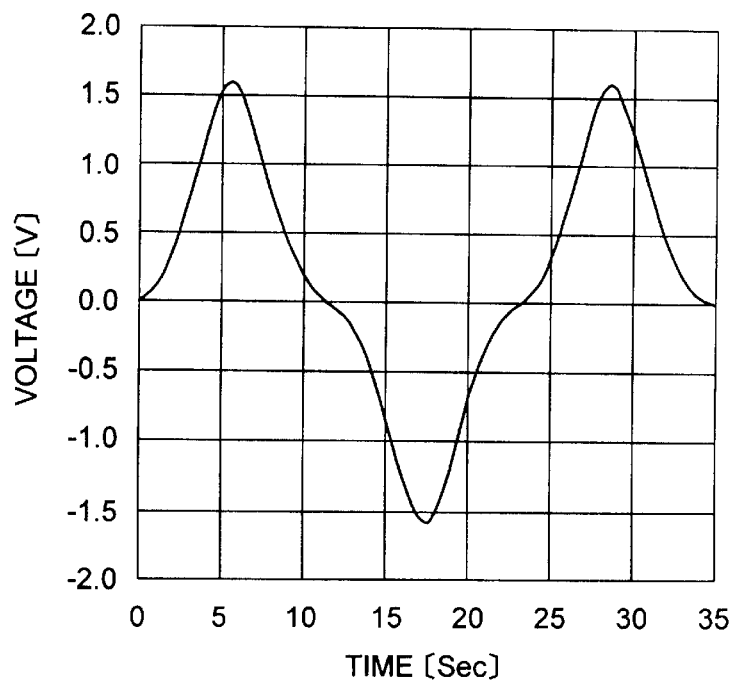
FIG. 27 is an output waveform in a permanent magnet generator according to the present invention.

Based on the above experiment results, ideal design specifications for the permanent magnet generator according to the present invention are given in Table. 3. A comparison of the aimed characteristics and output of a generator manufactured in accordance with these design specifications is shown in Table 4. FIG. 27 shows the output waveform.

TABLE 3

| Item | Specification |
|---|---|
| Size of generator | Outside dia. 55 mm × thick. 2 mm |
| Size of rotor | Outside dia. 30 mm × inside dia. 25 mm (hub dia.) × thick. 1.6 mm |
| Material of magnet | Sintered NdFeB radial anisotropic permanent magnet (The B-H curve is shown by solid lines in FIG. 15.) |

TABLE 3-continued

| Item | Specification |
| --- | --- |
| No. of rotor poles | 20 poles |
| Material of stator | Cold-rolled steel sheet SPCC (Saturation flux density: 1.5 T |
| No. of stator poles | 20 poles (18 poles as two poles replaced with notches) |
| Stator winding | No. of turns: 100 turns × 18 poles (1800 turns) Wire dia.: 0.14 mm Series connection |
| Size of stator | Thick. of enclosed-slot bridged part: 0.5 mm Width of magnetic pole teeth: 3 mm Thick. of magnetic pole teeth: 0.7 mm Angle of tapers: 180° |
| Magnetic gap | 0.3 mm on one side |
| Revolution | 300 rpm |

TABLE 4

| Item | Aimed specification | Experiment results |
| --- | --- | --- |
| Outside dia. of generator | Not more than 55 mm | 55 mm |
| Thick. of generator | Not more than 2 mm | 2 mm |
| Revolution | 300 rpm | 300 rpm |
| Wiring resistance | Not more than 80 Ω | 22 Ω |
| VO-p voltage | Not less than 1.5 V | 1.6 V |
| Output | 15 mW | 16 mW |

Experiment 6

A generator manufactured in accordance with the design specifications shown in Table 3 was assembled into a cup-shaped shield plate housing made of 0.1 mm-thick cold-rolled steel sheet and incorporated into a 3.5" diskette, with a 0.1 mm-thick Permalloy magnetic shield sheet provided on the rear side of a plastic case shell on the opposite side of the housing. That is, a 0.1 mm-thick cold-rolled steel sheet housing was provided on one side of the generator, and a 0.1 mm-thick Permalloy sheet on the other side.

Leakage flux in the memory card space in the diskette case was less than 10 gauss, a drop to less than 2% from 500 gauss in the non-shielded case. That is, leakage flux was reduced of a level at which an IC card or magnetic card inserted in the space would not be adversely effected.

Figure 28:
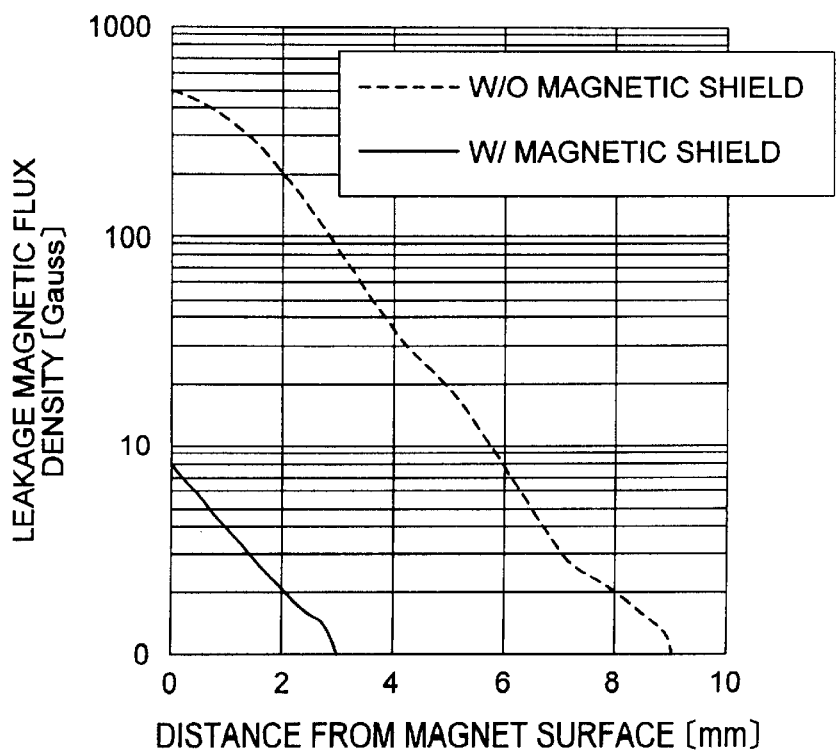
FIG. 28 is a graph showing the relationship between the intensity of leakage flux and the distance from the side surface of the diskette incorporating a permanent magnet generator according to the present invention, as compared with that in a generator having no magnetic shield.

FIG. 28 is a graph of leakage flux, with the distance from the diskette side face as the horizontal axis and the intensity of leakage flux as the vertical axis. As is evident from this figure, leakage flux was reduced to less than 10 gauss even in the immediate vicinity of the diskette. That is, leakage flux was reduced to an extent that a floppy disk placed by the side of the diskette would not be adversely affected by leakage flux.

The detailed construction of the permanent magnet generator according to the present invention, and the diskette incorporating the permanent magnet generator, that is, the detailed construction of the rotor and the stator, the material and number of poles of the permanent magnet, the construction that can reduce cogging torque, and the construction that can reduce leakage flux have become apparent by reference to the foregoing description of the embodiments and experiments.

Now, embodiments of a permanent magnet generator and a diskette incorporating the permanent magnet generator that can implement a thin, compact and high-power diskette incorporating a permanent magnet generator by minimizing the dead space will be described in the following.

Figure 29A:
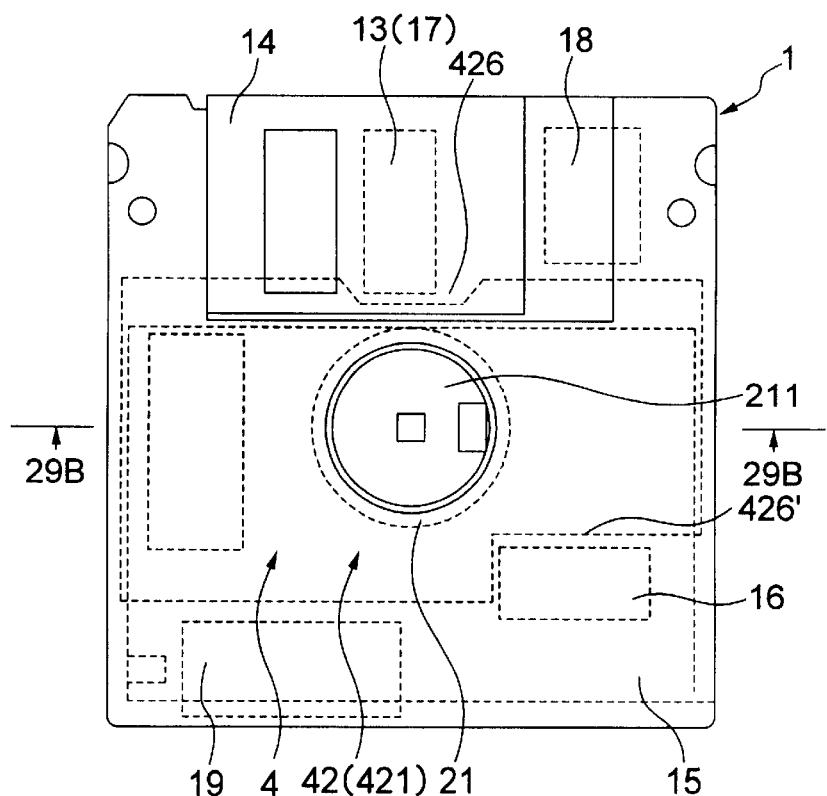
FIG. 29A being a plan (bottom) view of the diskette, FIG. 29B a cross-sectional view taken along line 29B—29B, and FIG. 29C a partially enlarged view of FIG. 29B.
Figure 29B:
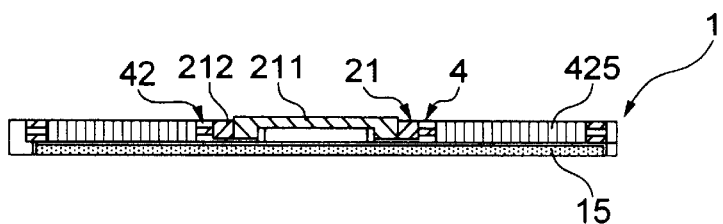
FIG. 29 shows a diskette incorporating a permanent magnet generator as another embodiment of the present invention.
Figure 29C:
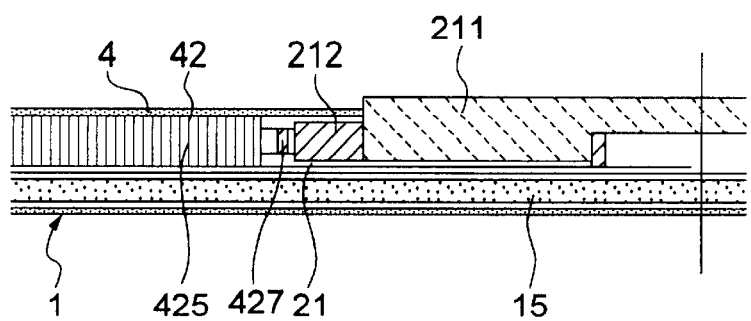
Figure 30:
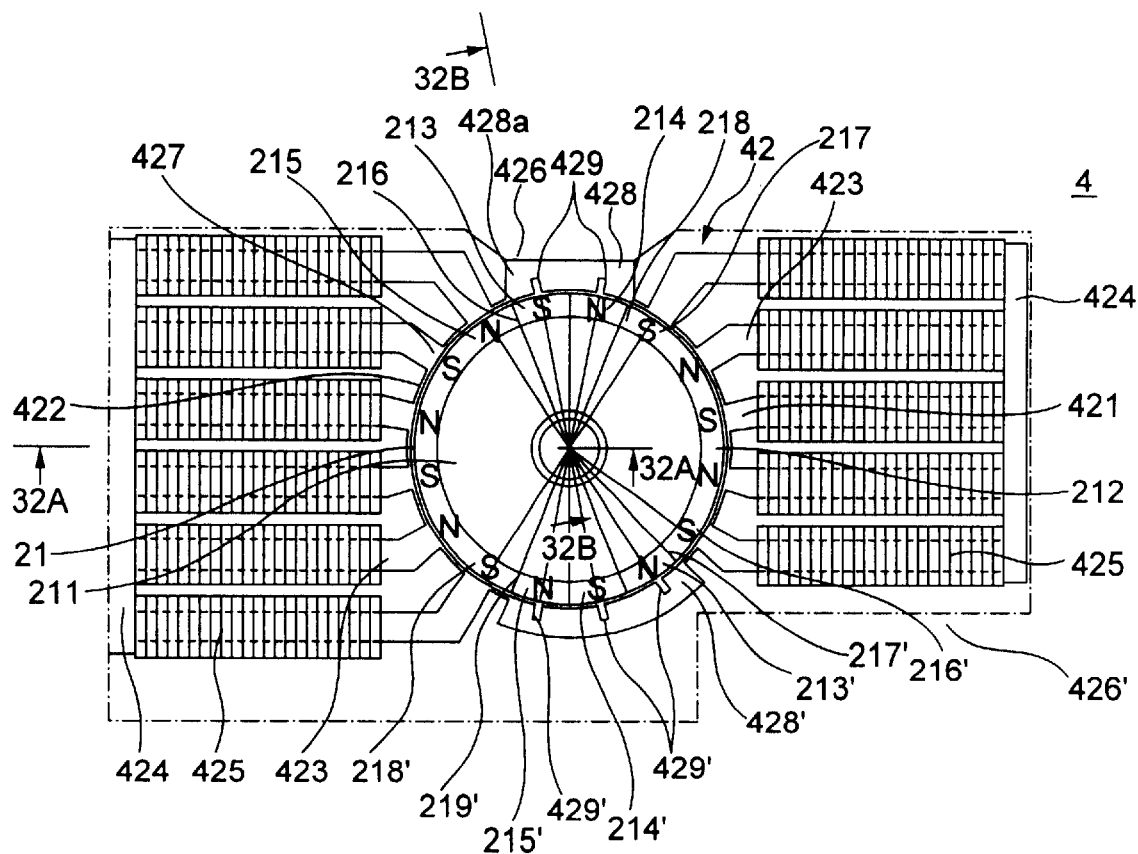
FIG. 30 is a plan view of the permanent magnet generator 4 taken out from the diskette of FIG, 29.
Figure 31:
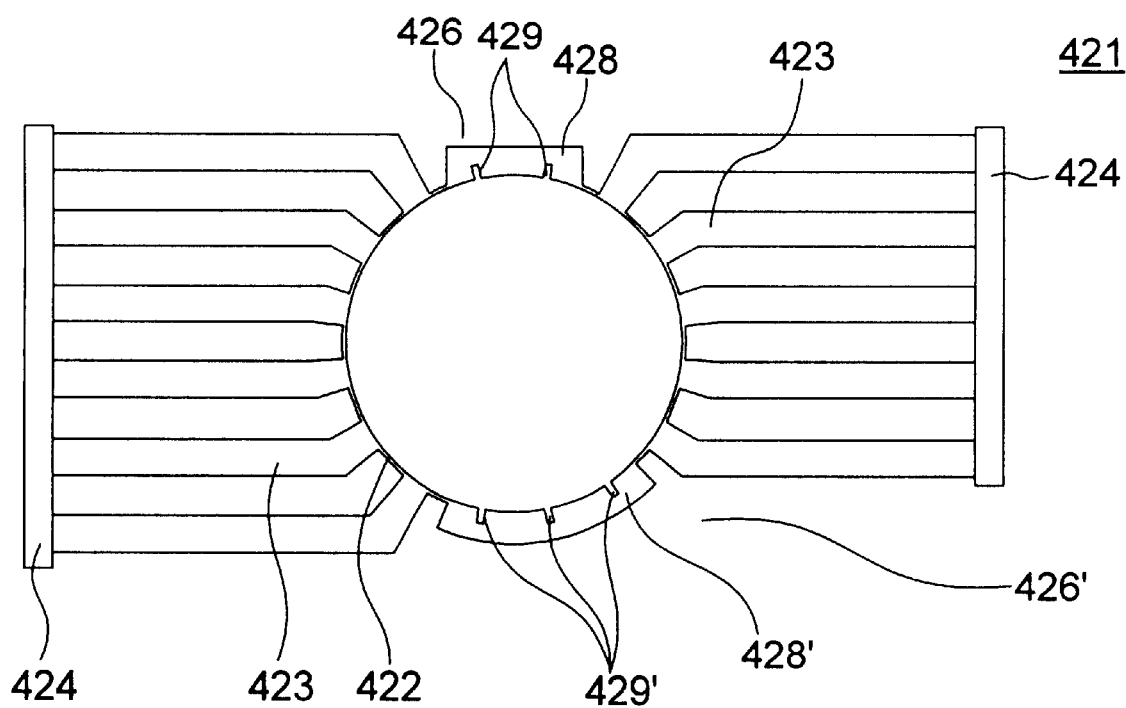
FIG. 31 is an enlarged plan view of the stator yoke 421 taken out from the diskette of FIG. 29.
Figure 32A:
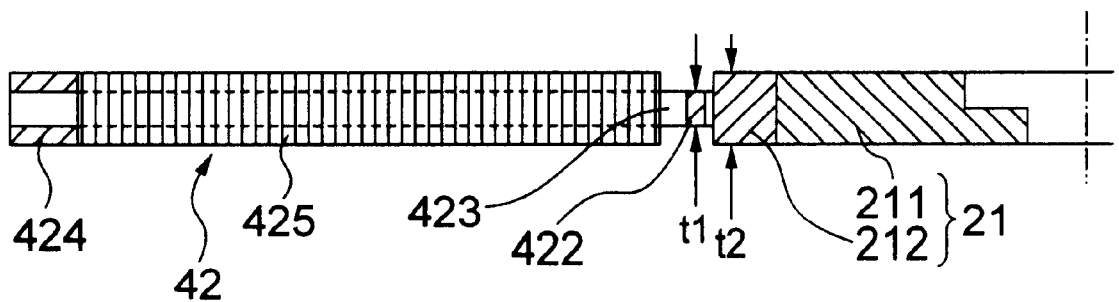
FIG. 32A is an enlarged cross-sectional view taken along line 32A—32A, and FIG. 32B an enlarged cross-sectional view taken along line 32B–32B in FIG. 30, respectively.
Figure 32B:
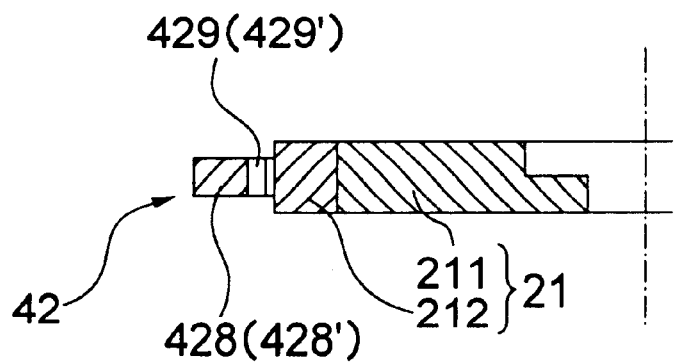

FIG. 29 shows another embodiment of a diskette incorporating the permanent magnet generator according to the present invention. The basic construction of the embodiment shown in FIG. 29 is the same as that of the embodiment shown in FIG. 1, except that the card contact terminal 16, the CPU 18 and the stabilized power supply circuit 19 are disposed at different positions. In this embodiment, improvements have been made on the construction of the magnetic pole teeth of the generator to eliminate the dead space to implement miniaturization. More specifically, FIG. 30 is a plan view of a generator 4, FIG. 31 is an enlarged plan view of a stator yoke 421, FIG. 32A is a cross-sectional view taken along line 32A—32A, and FIG. 32B is a cross-sectional view taken along line 32B—32B of FIG. 30. Like parts are indicated by like number used in FIG. 1 since these constructions correspond with that of the embodiment shown in FIG. 1.

A stator 42 having a plurality of stator magnetic poles 427 disposed in such a manner as to face the outer circumference of a permanent magnet 212 via magnetic gaps of substantially the same size is provided. The stator magnetic poles 427 of the magnetic pole teeth 423 made of soft magnetic material are provided on one end facing the outer circumference of the permanent magnet 212 in such a manner as to face the outer circumference of the permanent magnet 212 at a time. The magnetic poles 427 of the magnetic pole teeth 423 are disposed on the inner circumferential surface of the stator 42 at substantially equal intervals in such a manner as to face the rotor magnetic poles via magnetic gaps of substantially the same size at a time. For this reason, the number of the stator magnetic poles should ideally be the same as that of the rotor magnetic poles, but in the embodiment shown, the number of stator magnetic poles has been reduced by the number of notches 426 and 426' provided on the stator 42, as will be described later. On each of the magnetic pole teeth 423 wound is a stator coil 425, which is connected in series to each other. The expression "to face the rotor magnetic poles via magnetic gaps of substantially the same size at a time" means the extent to which the output waveforms from the stator coils provided on the magnetic pole teeth become almost the same, and yet the output waveform generated as the sum of outputs when the stator coils are connected in series to each other is not distorted remarkably.

Although an example where the stator yoke of the generator 2 comprises radially protruding magnetic pole teeth has been described in the previous embodiment, the stator yoke 421 in the present embodiment is such that the adjoining magnetic pole teeth are divided into several blocks. There are at least four magnetic pole teeth in each block, which are arranged substantially in parallel with each other. The stator magnetic poles 427 are disposed at substantially equal angular intervals, that is, radially with respect to the rotor, so that the stator magnetic poles 427 can face the rotor magnetic poles, whereas at least those portions on which the stator coils 425 are wound of the magnetic pole teeth 423 in each block are bent near the magnetic poles at the tips of the magnetic pole teeth so that the magnetic pole teeth in the block are arranged in parallel with each other. By doing so, the size of the generator can be reduced because the adjoining stator coils 425 are disposed close to each other. FIGS. 30 and 31 indicate that the adjoining magnetic pole teeth 423 are divided into two blocks; i.e., the left-hand block and the right-hand block. The magnetic pole teeth 423 in each block are connected to each other by sandwiching the ends opposite to the stator magnetic poles with upper and lower flat plate-shaped back yokes 424. In this case, the magnetic pole teeth 423 can be fixedly fitted by a back yoke having a U-shaped cross section because the ends opposite to the magnetic poles of the magnetic pole teeth 423 are arranged in a straight line. In the present invention, the entire magnetic pole teeth can be combined in one block, or divided into 2~4 blocks. Where various types of equipment are incorporated in a limited space, as in the diskette case, the number of blocks should be limited to 1 to 2 blocks to minimize the space for the generator.

In the stator yoke 421 as shown in FIGS. 30 and 31, at least those portions among the magnetic pole teeth 423 on which the stator coils 425 are wound are arranged in parallel. To clear other equipment to be incorporated in the diskette, the magnetic pole teeth 423 can be arranged in such a manner that the magnetic pole teeth within a block are arranged in parallel with each other, while the magnetic pole teeth in one block are not arranged in parallel with those in the other block. The expression "the magnetic pole teeth are arranged substantially in parallel with each other" includes such arrangements.

The magnetic pole teeth 423 in each block should preferably be such that the adjoining stator magnetic poles are connected to each other by an inner yoke 422. The construction in which the stator magnetic poles face the rotor magnetic poles at a time tends to increase cogging torque. Connecting the stator magnetic poles by an inner yoke 422 causes magnetic flux to leak between the magnetic poles, leading to reduced cogging torque. Increasing leakage flux between the magnetic poles in an attempt to reduce cogging torque, however, could reduce the effective flux passing in the magnetic pole teeth. To cope with this, the cross-sectional area of the inner yoke 422 between the stator magnetic poles is made smaller than the cross-sectional area of the stator magnetic pole teeth 423. When the width of the magnetic pole teeth is 3 mm, the thickness of the inner yoke is set to 0.5 mm to allow almost all magnetic flux coming out of the rotor magnetic poles to pass through the stator magnetic pole teeth.

The present invention has at least four magnetic pole teeth per block. This allows the number of blocks to be limited to one to four, for example, and the adjoining stator coils to be brought closer to each other. As a result, larger space can be provided between the blocks, reducing the space occupied by the generator in a limited space in the diskette case to allow other equipment to be installed between the blocks. In fact, when the number of rotor magnetic poles is 16 and the number of stator magnetic poles is 11, the length (the vertical length on the page in FIG. 30) of the generator 4 becomes the sum of the diameter of the rotor 2 and the size of the stator magnetic poles, that is, a considerably small space occupied by the generator to be incorporated into the diskette, by dividing the magnetic pole teeth 423 into two blocks. This is accomplished by bringing the adjoining stator coils 425 close to each other and arranging them in parallel with each other, leaving virtually no dead space between the coils.

Furthermore, the present invention has such a construction, as shown in the figure, that the stator magnetic poles 427 first extend radially from the circumferential surface of the rotor magnetic poles and then lead to the substantially parallel, adjoining magnetic pole teeth 423 within a block, and the adjoining magnetic pole teeth are disposed at unequal intervals. This construction avoids magnetic saturation and allows the stator coils to be effectively brought close to each other, contributing to miniaturization of the generator. Extending the magnetic poles straight and in parallel directly from the circumferential surface of the rotor magnetic poles, instead of extending radially, would make those magnetic poles on the outer fringes slenderer, and the widths of magnetic pole teeth uneven. Slender magnetic poles are not desirable because they tend to cause magnetic saturation, leading to a drop in power. Slender magnetic poles also make it difficult to wind stator coils, degrading workability. These problems can be solved by first extending the magnetic pole portions radially and then extending in parallel with each other while keeping the width of the magnetic pole teeth uniform. This, however, still leaves dead space between the adjoining magnetic pole teeth after the stator coils have been wound. The present invention makes it possible to achieve miniaturization by making the intervals between the magnetic pole teeth uneven, more specifically, reducing the intervals between the magnetic pole teeth on the outer fringes to bring the stator coils closer to each other.

As noted earlier, a card contact terminal 16 for connecting to a memory card and an input/output terminal for connecting to a floppy disk drive are provided on the diskette case 1 to exchange information. The present invention makes it possible to avoid interference between the generator 4 and the card contact terminal 16 and the input/output terminal 17.

Dividing the magnetic pole teeth 423 into right and left blocks eliminates upper and lower magnetic pole teeth of the rotor 21. There are no stator magnetic poles at the locations of the removed magnetic pole teeth, that is, at notches 426 and 426' provided on the generator 4. This means that when the stator magnetic poles are disposed facing the rotor magnetic poles at a time, some of the rotor magnetic poles falling on the notches .426 and 426' have no stator magnetic poles to face. The number of rotor magnetic poles facing no counterparts on the stator is at least one pole, or preferably not less than two poles. On the stator inner circumferential surface facing the rotor magnetic poles having no matching stator magnetic poles provided are soft magnetic pieces 428 and 428' made of soft magnetic material. The soft magnetic piece 428 magnetically connects the rotor magnetic poles on both sides of it. The soft magnetic pieces 428 and 428' shown in FIGS. 30 and 31 magnetically connect two rotor magnetic poles 213 and 214, and three rotor magnetic poles 213' to 214'. The radial lengths of the soft magnetic pieces 428 and 428' are shorter than the ordinary magnetic pole teeth 423, as shown in FIG. 32. In FIG. 30, the rotor magnetic poles S 213 and N 214 on the upper part do not face any stator magnetic poles. The left end 428a of the soft magnetic piece 428 is located at the mid-portion 216 between the S pole 213 and the N pole 215 at the left of the pole 213, from which the soft magnetic piece 428 extends rightward to the mid-portion 218 between the N magnetic pole 214 on the upper part, which does not face any stator magnetic pole, and the S pole 217 at the right of the pole 214. Grooves 429 are provided in the axial direction on the surface of the soft magnetic piece 428 facing the S and N poles of the rotor.

The rotor magnetic poles N 213', S 214' and N 215' at the lower right of the figure do not face any stator magnetic poles, and a soft magnetic piece 428' is provided instead of the stator magnetic poles. This soft magnetic piece 428' extends from the mid-portion 217' between the N pole 213' and the S pole 216' at the upper right of the pole 213' to the mid-portion 219' between the N pole 215', which does not face any stator magnetic pole, and S pole 218' at the upper left of the pole 215'. Grooves 429' are provided in the axial direction on the surface of the soft magnetic piece 428' facing the N pole 213', the S pole 214' and the N pole 215' of the rotor.

The soft magnetic pieces 428 and 428' magnetically connecting the magnetic poles are provided on the stator inner circumferential surface facing those rotor magnetic poles having no matching stator magnetic poles when the rotor magnetic poles fall on the locations at which they should face the stator magnetic poles. Moreover, grooves (extending in the axial direction) 429 and 429' are provided on the soft magnetic pieces 428 and 428' at the locations facing the rotor magnetic poles. Thus, when the rotor magnetic poles are at locations shifting from the stator magnetic poles that should face the rotor magnetic poles, the soft magnetic pieces magnetically short-circuit the rotor magnetic poles. At this time the soft magnetic pieces attract the rotor magnetic poles facing the ends of the soft magnetic pieces. When the rotor magnetic poles fall on the locations at which they should face the stator magnetic poles, on the other hand, the axially extending grooves provided on the soft magnetic pieces face the rotor magnetic poles, making the standstill of the rotor magnetic poles at those locations unstable, causing the rotor to move in the direction of the ends of the soft magnetic pieces.

The rotor magnetic poles facing the stator magnetic poles act to cause the rotor to stop at the position at which they face the stator magnetic poles, while the rotor magnetic poles facing the soft magnetic pieces act to cause the rotor to move from that position. Thus, the cogging torque of the rotor is reduced.

In the foregoing description, it is stated that the soft magnetic pieces 428 and 428' "connect the mid-portion between the magnetic poles on both sides of the rotor magnetic pole." The expression "the mid-portion between the magnetic poles" does not necessarily mean the central point between magnetic poles of different polarities when multiple magnetic poles are arranged on the outer circumferential surface of a cylindrical permanent magnet, but refers to peripheral parts excluding the center of the magnetic pole. When one rotor magnetic pole faces a stator magnetic pole, while the other rotor magnetic pole face a groove provided on a soft magnetic piece, attraction force at the position of the other rotor magnetic pole is reduced, and as a result, the rotor magnetic pole is attracted to the soft magnetic piece on the side of the groove to produce a turning moment. Thus, the end of the soft magnetic pole may be shifted from the rotor magnetic pole to such an extent that the turning moment is generated.

As the output of the generator is generated by the stator coils wound on the stator magnetic pole teeth provided in such a manner as to face the rotor magnetic poles, if the number of rotor magnetic poles is 16 poles and one of them does not face a stator magnetic pole, the magnetic force of the rotor permanent magnet is reduced by $\frac{1}{16}$. This loss of magnetic force can be compensated by increasing the number of coil turns. As described above, soft magnetic pieces are provided in place of the stator magnetic poles at locations which they should face rotor magnetic poles. The number of removed stator magnetic poles should preferably be at least one pole, or more preferably be not less than two poles in a row. The width of the grooves provided on the soft magnetic pieces should preferably be 0.1 to 0.4 of the width of the magnetic poles of the rotor permanent magnet. The width of the magnetic poles of the rotor permanent magnet is obtained as $2 \times \pi (360°)/n$ (n: no. of rotor poles). The depth of the grooves may be more than the magnetic gap between the rotor and the stator.

Figure 33:
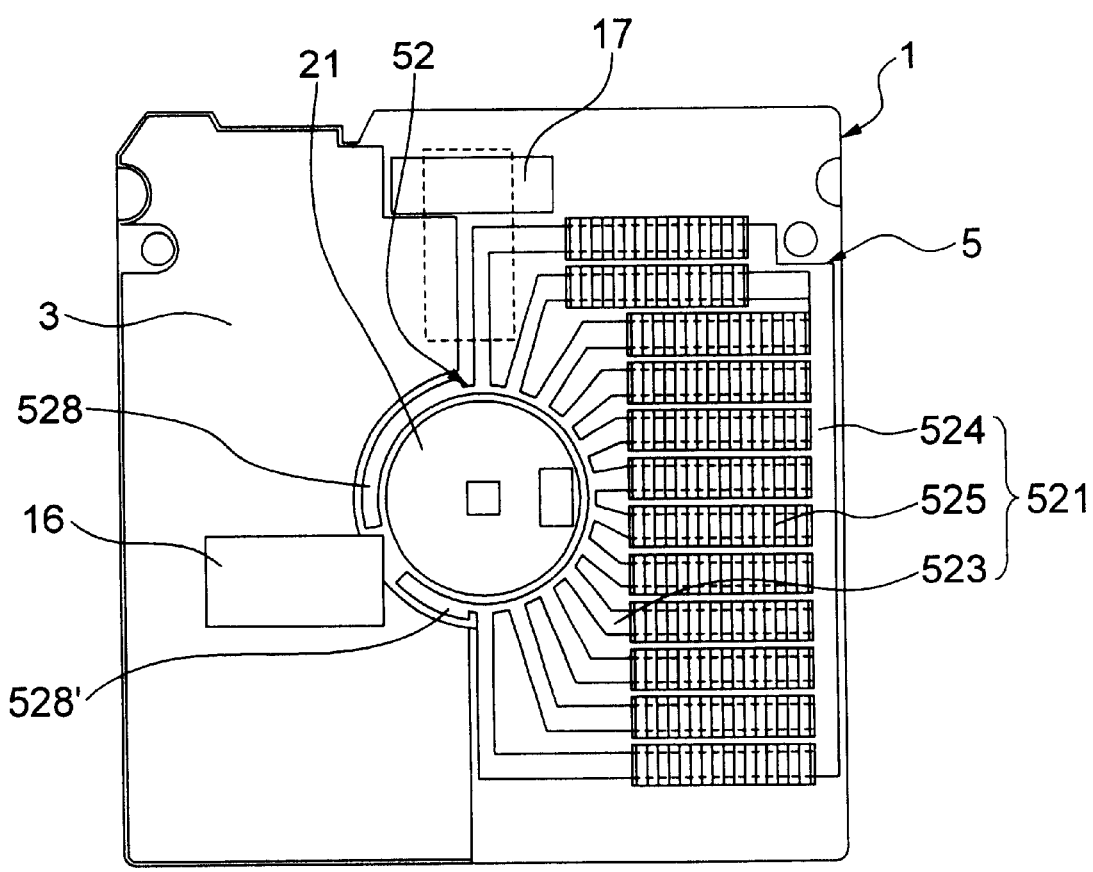
FIG. 33 is a plan view of a diskette incorporating a permanent magnet generator that is still another embodiment of the present invention, with the back plate removed.

Next, a diskette incorporating a permanent magnet generator as still another embodiment of the present invention will be described in the following. In this embodiment, a printed circuit board 3 is provided on the left half of a diskette case 1, and a card contact terminal 16 is provided on the printed circuit board 3, as shown in FIG. 33. A permanent magnet generator 5 is provided on the right half of the diskette 1. In the figure, a rotor 21 is the same as that shown in FIGS. 29–32, except for the arrangement of magnetic poles. All the magnetic pole teeth 523 of the stator yoke 521 of the stator 52 constitute one block, with at least the portions of the magnetic pole teeth 523 on which coils 525 are wound arranged in parallel and in close vicinity with each other. Each of the magnetic pole teeth 523 is bent at the tip where the magnetic pole is provided. The magnetic poles are arranged radially with respect to the rotor. The ends opposite to the magnetic poles of the magnetic pole teeth 523 are connected to each other by a back yoke 524. When the rotor is positioned so that the stator magnetic poles face the rotor magnetic poles, the left-hand magnetic poles of the rotor in the figure do not face the stator magnetic poles. On the stator inner circumferential surface facing those rotor magnetic poles having no matching stator magnetic poles provided are soft magnetic pieces 528 and 528', which magnetically connect the mid-portions between rotor magnetic poles on both sides of the facing rotor magnetic poles. Since the function of these soft magnetic pieces has already been described in the foregoing, further description is omitted here. Numeral 17 denotes an input/output terminal whose function will not require further description. Combining magnetic pole teeth into one block allows a space for a printed circuit board to be provided with a limited space within the diskette.

The following experiment was conducted on the permanent magnet generator shown in FIG. 30.

Experiment 7

The bottom area of the permanent magnet generator shown in FIG. 30 manufactured on the basis of design specifications shown in Table 5 was 2,867 mm$^2$. A circular generator having an equivalent power would require a circular stator yoke of a diameter of 77 mm, and a space for the generator of 3,490 mm$^2$. Thus, the bottom area of the permanent magnet generator according to the this embodiment would be reduced by 623 mm$^2$ to 82% of the above-mentioned equivalent generator.

TABLE 5

| Item | Specification |
| --- | --- |
| Size of stator yoke | Outer dimensions (36 mm × 79 mm) × inside dia. 29.4 mm × thickness 0.8 mm |
| Size of rotor | Outside dia. 29.0 mm × inside dia. 25 mm (hub dia.) × thick. 2.0 mm |
| Permanent magnet | Sintered NdFeB radial anisotropic permanent magnet (Br: 1.24 T bHc: 9.3 × 10$^{-2}$ kA/m) |
| No. of rotor poles | 16 poles |
| Material of stator | Cold-rolled steel sheet SPCC Saturation flux density Bs: 1.5 T |
| No. stator poles | 16 poles (5 of which were removed and replaced by soft magnetic pieces) |
| Stator coils | No. of turns: 600 turns/pole Wire dia.: 0.16 mm Coil resistance: 65Ω (11 poles) Series connection |
| Inner yoke | Min. thick. (radial)/magnetic pole tooth width: 0.5 mm/3.5 mm Angle of tapers: 180° |
| Magnetic gap | 0.2 mm on one side |
| Revolution | 300 rpm |

As described in detail above, a substantially flat disk-shaped permanent magnet generator that can be incorporated in a 3.5" diskette and eliminate wasted space has been realized with the present invention. With this generator, input/output and card contact terminals that pose a problem in incorporating into a diskette can be easily cleared, and a desired magnitude of output can be obtained.

Since a yoke that can reduce magnetic resistance in the stator yoke is provided, a sufficient output can be obtained. And the generator realized is easy to assemble and manufacture.

The permanent magnet generator according to the present invention can reduce cogging torque, ensure smooth rotation even when driven with a small driving torque, and produce output waveforms with less distortion.

The diskette incorporating a permanent magnet generator according to the present invention can absorb misalignment of the hub and the drive shaft, and is hardly subjected to the adverse effects of magnetic leakage even when used in conjunction with magnetic stripes of memory cards, or other types of floppy disks.

What is claimed is:

1. A diskette incorporating a permanent magnet generator comprising:
    a diskette case; and
    a permanent magnet generator incorporated in the diskette case, the permanent magnet generator having
        (1) a rotor having a ring-shaped permanent magnet that is rotatable together with a hub, the permanent magnet having a plurality of rotor magnetic poles arranged on the circumferential surface, the rotor magnetic poles having alternately different polarities in the circumferential direction, and
        (2) a stator having a plurality of magnetic pole teeth made of soft magnetic material, the magnetic pole teeth
            (I) having on first ends thereof stator magnetic poles facing the rotor magnetic poles via a magnetic gap,
            (II) extending outward from the stator magnetic poles and having stator coils wound thereon, and
            (III) having second ends opposite to the stator magnetic poles that are connected together by a back yoke made of soft magnetic material,
    wherein the rotor and the stator are formed into a flat disk shape as a whole, and the axial thickness of the stator magnetic poles is smaller than the axial thickness of the permanent magnet.

2. A diskette incorporating a permanent magnet generator according to claim 1, wherein the rotor permanent magnet has the axis of easy magnetization in the radial direction.

3. A diskette incorporating a permanent magnet generator according to claim 2, wherein the rotor permanent magnet is a sintered NdFeB magnet.

4. A diskette incorporating a permanent magnet generator according to claim 1, wherein the rotor permanent magnet has the axis of easy magnetization in the direction in which the adjoining magnetic poles of different polarities on the circumference thereof are connected.

5. A diskette incorporating a permanent magnet generator according to claim 4, wherein the rotor permanent magnet is a sintered NdFeB magnet.

6. A diskette incorporating a permanent magnet generator according to claim 1, wherein the rotor permanent magnet is a magnet manufactured by bonding NdFeB powder by a binder.

7. A diskette incorporating a permanent magnet generator according to claim 1, wherein the adjoining stator magnetic poles facing the permanent magnet at the tips of the stator magnetic pole teeth are connected to each other by an inner yoke.

8. A diskette incorporating a permanent magnet generator according to claim 7, wherein the inner yoke connecting the adjoining stator magnetic poles at the tips of the magnetic pole teeth has a thinnest thickness at the central part between the adjoining stator magnetic poles.

9. A diskette incorporating a permanent magnet generator according to claim 7, wherein the cross-sectional area at the central part between the adjoining stator magnetic poles of the inner yoke connecting the adjoining stator magnetic poles at the tips of the magnetic pole teeth is smaller than the cross-sectional area of the magnetic pole teeth.

10. A diskette incorporating a permanent magnet generator according to claim 1, wherein a space for inserting a memory card is provided in the diskette case.

11. A diskette incorporating a permanent magnet generator according to claim 10, wherein the space for inserting a memory card and the permanent magnet generator at least partially overlap; at least part of a boundary wall being a magnetic shield plate.

12. A diskette incorporating a permanent magnet generator according to claim 11, wherein the boundary wall is a housing of the permanent magnet generator.

13. A diskette incorporating a permanent magnet generator according to claim 1, wherein a holding mechanism that can absorb the misalignment of the permanent magnet generator with respect to the diskette case is provided in the diskette case.

14. A diskette incorporating a permanent magnet generator according to claim 1, wherein a hub of the permanent magnet generator can be engaged with a drive shaft of a disk drive unit.

15. A diskette incorporating a permanent magnet generator according to claim 1, wherein the diskette has such a construction as to be fitted to a 3.5" floppy disk drive.

16. A diskette incorporating a permanent magnet generator according to claim 1, wherein the magnetic poles the rotor permanent magnet has on the circumferential surface thereof are disposed at substantially equal angular intervals; the number of poles thereof being 12 to 24 poles and each of the magnetic poles of the stator magnetic pole teeth being disposed in such a manner to face each of the rotor magnetic poles.

17. A diskette incorporating a permanent magnet generator according to claim 1, wherein the magnetic poles the rotor permanent magnet has on the circumferential surface thereof are disposed at substantially equal angular intervals; the number of poles thereof being 12 to 24 poles and each of the magnetic poles of the stator magnetic pole teeth being disposed in such a manner to face each of the rotor magnetic poles, except for at least one pole.

18. A diskette incorporating a permanent magnet generator according to claim 1, wherein
    (I) the stator magnetic poles are provided on the stator at substantially equal angular intervals around the permanent magnet, but not on a portion of the stator facing at least one rotor magnetic pole, such that the stator magnetic poles face the rotor magnetic poles, except for the at least one rotor magnetic pole, and
    (II) the second ends of the magnetic pole teeth having the stator magnetic poles provided at substantially equal angular intervals are connected together by the back yoke made of soft magnetic material.

19. A diskette incorporating a permanent magnet generator according to claim 18, wherein the rotor permanent magnet has the axis of easy magnetization in the radial direction.

20. A diskette incorporating a permanent magnet generator according to claim 19, wherein the rotor permanent magnet is a sintered NdFeB magnet.

21. A diskette incorporating a permanent magnet generator according to claim 18, wherein the rotor permanent magnet has the axis of easy magnetization in the direction in which the adjoining magnetic poles of different polarities on the circumference thereof are connected.

22. A diskette incorporating a permanent magnet generator according to claim 21, wherein the rotor permanent magnet is a sintered NdFeB magnet.

23. A diskette incorporating a permanent magnet generator according to claim 18, wherein the rotor permanent magnet is a magnet manufactured; by bonding NdFeB magnet powder by a binder.

24. A diskette incorporating a permanent magnet generator according to claim 18, wherein any of a diskette input/output terminal, a card contact terminal and a memory card inserting space is provided between the stator magnetic pole teeth that are not connected to each other by the back yoke.

25. A diskette incorporating a permanent magnet generator according to claim 18, wherein the diskette has such a construction as to be fitted to a 3.5" floppy disk drive.

26. A diskette incorporating a permanent magnet generator comprising:
   a diskette case; and
   a permanent magnet generator provided in the diskette case, the permanent magnet generator having
      (1) a rotor having a ring-shaped permanent magnet that is rotatable together with a hub, the permanent magnet having a plurality of rotor magnetic poles arranged on the circumferential surface, the rotor magnetic poles having alternately different polarities in the circumferential direction, and
      (2) a stator having a plurality of magnetic pole teeth made of soft magnetic material, the magnetic pole teeth
         (I) having on first ends thereof stator magnetic poles that face the rotor magnetic poles via a magnetic gap,
         (II) extending outward from the stator magnetic poles and having magnetic pole tooth portions on which stator coils are wound, and
         (III) being combined into at least one block, the magnetic pole tooth portions in each block (a) disposed substantially in parallel with each other, and (b) having second ends opposite to the stator magnetic poles that are connected together by a back yoke,
   wherein the rotor and the stator are formed into a flat disk; shape as a whole, and the axial thickness of the stator magnetic poles is smaller than the axial thickness of the permanent magnet.

27. A diskette incorporating a permanent magnet generator according to claim 26, wherein the rotor permanent magnet has the axis of easy magnetization in the radial direction.

28. A diskette incorporating a permanent magnet generator according to claim 27, wherein the rotor permanent magnet is a sintered NdFeB magnet.

29. A diskette incorporating a permanent magnet generator according to claim 26, wherein the rotor permanent magnet has the axis of easy magnetization in the direction in which the adjoining magnetic poles of different polarities on the circumference thereof are connected.

30. A diskette incorporating a permanent magnet generator according to claim 29, wherein the rotor permanent magnet is a sintered NdFeB magnet.

31. A diskette incorporating a permanent magnet generator according to claim 26, wherein the rotor permanent magnet is a magnet manufactured by bonding NdFeB magnet powder by a binder.

32. A diskette incorporating a permanent magnet generator according to claim 26, wherein the number of magnetic pole teeth in a block is at least 4.

33. A diskette incorporating a permanent magnet generator according to claim 32, wherein the magnetic pole tooth portions provided in substantially parallel with each other in the block are disposed at unequal intervals.

34. A diskette incorporating a permanent magnet generator according to claim 26, wherein the number of blocks is one.

35. A diskette incorporating a permanent magnet generator according to claim 34, wherein the magnetic pole tooth portions provided in substantially parallel with each other are disposed at unequal intervals.

36. A diskette incorporating a permanent magnet generator according to claim 26, wherein any of a diskette input/output terminal, a card contact terminal and a memory card inserting space is provided between the stator magnetic pole teeth that are not connected to each other by the back yoke.

37. A diskette incorporating a permanent magnet generator according to claim 26, wherein the diskette has such a construction as to be fitted to a 3.5" floppy disk drive.

38. A permanent magnet generator incorporated in a diskette case comprising:
   (1) a rotor having a ring-shaped permanent magnet that is rotatable together with a hub, the permanent magnet having a plurality of rotor magnetic poles arranged on the circumferential surface, the magnetic poles having alternately different polarities in the circumferential direction; and
   (2) a stator having a plurality of magnetic pole teeth made of soft magnetic material, the magnetic pole teeth
      (I) having on first ends thereof stator magnetic poles facing the rotor magnetic poles via a magnetic gap,
      (II) extending outward from the stator magnetic poles and having stator coils wound thereon, and
      (III) having second ends opposite to the stator magnetic poles that are connected together by a back yoke,
   wherein the rotor and the stator are formed into a flat disk shape as a whole, and the axial thickness of the stator magnetic poles is smaller than the axial thickness of the permanent magnet.

39. A permanent magnet generator incorporated in a diskette according to claim 38, wherein the rotor permanent magnet has the axis of easy magnetization in the radial direction.

40. A permanent magnet generator incorporated in a diskette according to claim 39, wherein the rotor permanent magnet is a sintered NdFeB magnet.

41. A permanent magnet generator incorporated in a diskette according to claim 38, wherein the rotor permanent magnet has the axis of easy magnetization in the direction in which the adjoining magnetic poles of different polarities on the circumference thereof are connected.

42. A permanent magnet generator incorporated in a diskette according to claim 41, wherein the rotor permanent magnet is a sintered NdFeB magnet.

43. A permanent magnet generator incorporated in a diskette according to claim 38, wherein the rotor permanent magnet is a magnet manufactured by bonding NdFeB magnet powder by a binder.

44. A permanent magnet generator incorporated in a diskette according to claim 38, wherein the adjoining stator magnetic poles facing the permanent magnet at the tips of the stator magnetic pole teeth are connected to each other by an inner yoke.

45. A permanent magnet generator incorporated in a diskette according to claim 44, wherein the inner yoke connecting the adjoining stator magnetic poles at the tips of the magnetic pole teeth has a thinnest thickness at the central part between the adjoining stator magnetic poles.

46. A permanent magnet generator incorporated in a diskette according to claim 44, wherein the cross-sectional area at the central part between the adjoining stator magnetic poles of the inner yoke connecting the adjoining stator magnetic poles at the tips of the magnetic pole teeth is smaller than the cross-sectional area of the magnetic pole teeth.

47. A permanent magnet generator incorporated in a diskette according to claim 38, wherein the magnetic poles the rotor permanent magnet has on the circumferential surface thereof are disposed at substantially equal angular intervals; the number of poles thereof being 12 to 24 poles and each of the magnetic poles of the stator magnetic pole teeth being disposed in such a manner to face each of the rotor magnetic poles.

48. A permanent magnet generator incorporated in a diskette according to claim 38, wherein the magnetic poles the rotor permanent magnet has on the circumferential surface thereof are disposed at substantially equal angular intervals; the number of poles thereof being 12 to 24 poles and each of the magnetic poles of the stator magnetic pole teeth being disposed in such a manner to face each of the rotor magnetic poles, except for at least one pole.

49. A permanent magnet generator incorporated in a diskette according to claim 38, wherein
  (I) the stator magnetic poles are provided on the stator at substantially equal angular intervals around the permanent magnet, but not on a portion of the:,stator facing at least one rotor magnetic pole, such that the stator magnetic poles face the rotor magnetic poles, except for the at least one rotor magnetic pole, and
  (II) the second ends of the magnetic pole teeth having the stator magnetic poles provided at substantially equal angular intervals being connected together by the back yoke made of soft magnetic material.

50. A permanent magnet generator incorporated in a diskette according to claim 49, wherein the rotor permanent magnet has the axis of easy magnetization in the radial direction.

51. A permanent magnet generator incorporated in a diskette according to claim 50, wherein the rotor permanent magnet is a sintered NdFeB magnet.

52. A permanent magnet generator incorporated in a diskette according to claim 49, wherein the rotor permanent magnet has the axis of easy magnetization in the direction in which the adjoining magnetic poles of different polarities on the circumference thereof are connected.

53. A permanent magnet generator incorporated in a diskette according to claim 52, wherein the rotor permanent magnet is a sintered NdFeB magnet.

54. A permanent magnet generator incorporated in a diskette according to claim 49, wherein the rotor permanent magnet is a magnet manufactured by bonding NdFeB magnet powder by a binder.

55. A permanent magnet generator incorporated in a diskette comprising:
  (1) a rotor having a ring-shaped permanent magnet that is rotatable together with a hub, the permanent magnet having a plurality of rotor magnetic poles arranged on the circumferential surface, the rotor magnetic poles having alternately different polarities in the circumferential direction; and
  (2) a stator having a plurality of magnetic pole teeth made of soft magnetic material, the magnetic pole teeth
    (I) having on first ends thereof stator magnetic poles that face the rotor magnetic poles via a magnetic gap,
    (II) extending outward from the stator magnetic poles and having magnetic pole tooth portions on which stator coils are wound, and
    (III) being combined into at least one block, the magnetic pole tooth portions in each block (a) disposed substantially in parallel with each other, and (b) having second ends opposite to the stator magnetic poles that are connected together by a back yoke,
wherein the rotor and the stator are formed into a flat disk shape as a whole, and the axial thickness of the stator magnetic poles is smaller than the axial thickness of the permanent magnet.

56. A permanent magnet generator incorporated in a diskette according to claim 55, wherein the rotor permanent magnet has the axis of easy magnetization in the radial direction.

57. A permanent magnet generator incorporated in a diskette according to claim 56, wherein the rotor permanent magnet is a sintered NdFeB magnet.

58. A permanent magnet generator incorporated in a diskette according to claim 55, wherein the rotor permanent magnet has the axis of easy magnetization in the direction in which the adjoining magnetic poles of different polarities on the circumference thereof are connected.

59. A permanent magnet generator incorporated in a diskette according to claim 58, wherein the rotor permanent magnet is a sintered NdFeB magnet.

60. A permanent magnet generator incorporated in a diskette according to claim 55, wherein the rotor permanent magnet is a magnet manufactured by bonding NdFeB magnet powder by a binder.

61. A permanent magnet generator incorporated in a diskette according to claim 55, wherein the number of magnetic pole teeth in a block is at least four.

62. A permanent magnet generator incorporated in a diskette according to claim 61, wherein the magnetic pole tooth portions provided in substantially parallel with each other in a block are disposed at unequal intervals.

63. A permanent magnet generator incorporated in a diskette according to claim 55, wherein the number of blocks is one.

64. A permanent magnet generator incorporated in a diskette according to claim 63, wherein the magnetic pole tooth portions provided in substantially parallel with each other in a block are disposed at unequal intervals.

* * * * *